(12) United States Patent
Bullough et al.

(10) Patent No.: US 12,567,402 B1
(45) Date of Patent: Mar. 3, 2026

(54) PREDICTING ENTITY SALIENCE

(71) Applicant: Amazon Technologies, Inc., Seattle, WA (US)

(72) Inventors: Benjamin Lynn Bullough, Bedford, MA (US); Harrison Graham Lundberg, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 18/617,959

(22) Filed: Mar. 27, 2024

(51) Int. Cl.
G10L 15/16 (2006.01)
G10L 15/06 (2013.01)
G10L 15/197 (2013.01)
G10L 15/22 (2006.01)

(52) U.S. Cl.
CPC ............ G10L 15/16 (2013.01); G10L 15/063 (2013.01); G10L 15/197 (2013.01); G10L 15/22 (2013.01)

(58) Field of Classification Search
CPC ..... G10L 15/16; G10L 15/063; G10L 15/197; G10L 15/22
USPC ........................................................ 704/232
See application file for complete search history.

(56) References Cited

U.S. PATENT DOCUMENTS

| | | | | | |
|---|---|---|---|---|---|
| 5,212,730 | A | * | 5/1993 | Wheatley ............... | G06N 3/047 704/256.1 |
| 8,001,157 | B2 | * | 8/2011 | Bier ........................ | G06F 16/34 704/9 |
| 8,594,996 | B2 | * | 11/2013 | Liang .................... | G06F 40/247 704/10 |
| 9,190,055 | B1 | * | 11/2015 | Kiss ....................... | G10L 15/063 |
| 9,319,504 | B2 | * | 4/2016 | Schroeter ............ | H04M 1/6058 |
| 9,454,957 | B1 | * | 9/2016 | Mathias ............... | G06F 40/295 |
| 10,102,845 | B1 | * | 10/2018 | Abu Zaki .............. | G10L 15/26 |
| 10,102,851 | B1 | * | 10/2018 | Kiss ........................ | G10L 15/05 |
| 10,276,152 | B2 | * | 4/2019 | Gross .................... | G10L 15/063 |
| 10,803,100 | B2 | * | 10/2020 | Ackermann ........... | H04L 51/02 |
| 10,825,449 | B1 | * | 11/2020 | Chinnalagu .......... | G06F 16/353 |
| 11,604,925 | B1 | * | 3/2023 | Lee ...................... | G06N 3/0442 |
| 11,615,250 | B2 | * | 3/2023 | Tan ........................ | G10L 15/22 704/9 |
| 11,626,106 | B1 | * | 4/2023 | Ping ....................... | G10L 15/22 704/235 |
| 11,741,950 | B2 | * | 8/2023 | Park ....................... | G06F 40/30 704/257 |
| 11,782,985 | B2 | * | 10/2023 | Galitsky ................ | G06F 40/35 704/9 |
| 12,046,240 | B2 | * | 7/2024 | Jones ..................... | G10L 15/22 |

(Continued)

*Primary Examiner* — Thuykhanh Le

(74) *Attorney, Agent, or Firm* — Pierce Atwood LLP

(57) ABSTRACT

Systems and methods are described for predicting entity salience in segments of text, including short segments of text, where salience may refer to the importance or centrality of the entity to the content of the text. The system may use an entity salience model that can encode the context (e.g., the segment of text) into a passage embedding and an entity into an entity embedding. In some cases, the entity embedding may be determined using the entity as well as a natural language description of the entity from, for example, a knowledge graph or other resource. The entity salience model may calculate an entity score for each entity represented in the text based on, for example, a similarity between that entity's entity embedding and the passage embedding. The entity salience score maybe used to, for example, identify additional content with which to augment a response to a user input.

20 Claims, 12 Drawing Sheets

System
100

(56)         References Cited

U.S. PATENT DOCUMENTS

| | | | |
|---|---|---|---|
| 12,117,838 B1* | 10/2024 | Sigurdsson | G10L 15/22 |
| 12,379,894 B1* | 8/2025 | Raux | G06F 3/167 |
| 2005/0251382 A1* | 11/2005 | Chang | G10L 15/18 |
| | | | 704/9 |
| 2005/0273336 A1* | 12/2005 | Chang | G06F 40/247 |
| | | | 704/E15.024 |
| 2007/0021956 A1* | 1/2007 | Qu | G06F 40/263 |
| | | | 704/8 |
| 2007/0038437 A1* | 2/2007 | Brun | G06F 40/295 |
| | | | 715/209 |
| 2013/0291019 A1* | 10/2013 | Burkitt | G06F 16/7834 |
| | | | 725/53 |
| 2013/0322765 A1* | 12/2013 | Neumann | G06V 20/46 |
| | | | 382/197 |
| 2014/0200895 A1* | 7/2014 | Stephens, Jr. | G06F 16/9535 |
| | | | 704/260 |
| 2015/0052121 A1* | 2/2015 | Sharifi | G06F 16/435 |
| | | | 707/723 |
| 2015/0057995 A1* | 2/2015 | Neumann | G06V 20/41 |
| | | | 704/8 |
| 2015/0281162 A1* | 10/2015 | Shen | G10L 15/1822 |
| | | | 709/206 |
| 2015/0348565 A1* | 12/2015 | Rhoten | G06F 16/243 |
| | | | 704/270.1 |
| 2018/0217804 A1* | 8/2018 | Manohar | G06V 20/20 |
| 2018/0300421 A1* | 10/2018 | Andreica | G10L 15/22 |
| 2019/0013023 A1* | 1/2019 | Pourmohammad | |
| | | | H04L 12/2803 |
| 2019/0236204 A1* | 8/2019 | Canim | G10L 15/1815 |
| 2019/0237068 A1* | 8/2019 | Canim | G06F 16/90332 |
| 2019/0392827 A1* | 12/2019 | Park | G10L 15/1822 |
| 2020/0042602 A1* | 2/2020 | Anderson | G06F 40/56 |
| 2020/0089757 A1* | 3/2020 | Machado | G10L 15/1815 |
| 2020/0135213 A1* | 4/2020 | Kim | G10L 15/22 |
| 2020/0193264 A1* | 6/2020 | Zavesky | G06N 20/00 |
| 2021/0034662 A1* | 2/2021 | Aher | G06F 16/635 |
| 2021/0034663 A1* | 2/2021 | Aher | G06F 16/635 |
| 2021/0035587 A1* | 2/2021 | Aher | G10L 15/187 |
| 2021/0110811 A1* | 4/2021 | Joseph | G10L 13/10 |
| 2021/0240931 A1* | 8/2021 | Farri | G16H 30/40 |
| 2021/0294976 A1* | 9/2021 | Markarian | G06F 40/30 |
| 2022/0208182 A1* | 6/2022 | Zhang | G06F 40/35 |
| 2022/0253605 A1* | 8/2022 | Tan | G06Q 10/1093 |
| 2022/0254348 A1* | 8/2022 | Tay | G06F 16/345 |
| 2022/0319508 A1* | 10/2022 | Furman | G06F 40/30 |
| 2022/0337740 A1* | 10/2022 | Takagi | H04N 23/695 |
| 2022/0391455 A1* | 12/2022 | Appikatala | G06F 16/954 |
| 2023/0020779 A1* | 1/2023 | Roberts | G06F 40/30 |
| 2023/0077515 A1* | 3/2023 | Aditya | G06N 5/04 |
| | | | 704/9 |
| 2023/0139626 A1* | 5/2023 | Berliner | G06F 3/1423 |
| | | | 345/156 |
| 2023/0236575 A1* | 7/2023 | Pai | G06F 40/56 |
| | | | 700/28 |
| 2023/0245651 A1* | 8/2023 | Wang | G06N 5/022 |
| | | | 704/275 |
| 2024/0013158 A1* | 1/2024 | Zahavi | G06F 3/0482 |
| 2024/0087606 A1* | 3/2024 | Miller | H04N 7/155 |
| 2024/0214332 A1* | 6/2024 | Yu | G06F 40/279 |
| 2024/0290325 A1* | 8/2024 | Yang | G06F 16/632 |
| 2025/0166609 A1* | 5/2025 | Dreyer | G10L 15/16 |
| 2025/0225370 A1* | 7/2025 | Choubey | G06N 3/045 |
| 2025/0324140 A1* | 10/2025 | Burkitt | H04N 21/26603 |

* cited by examiner

Figure 6A:
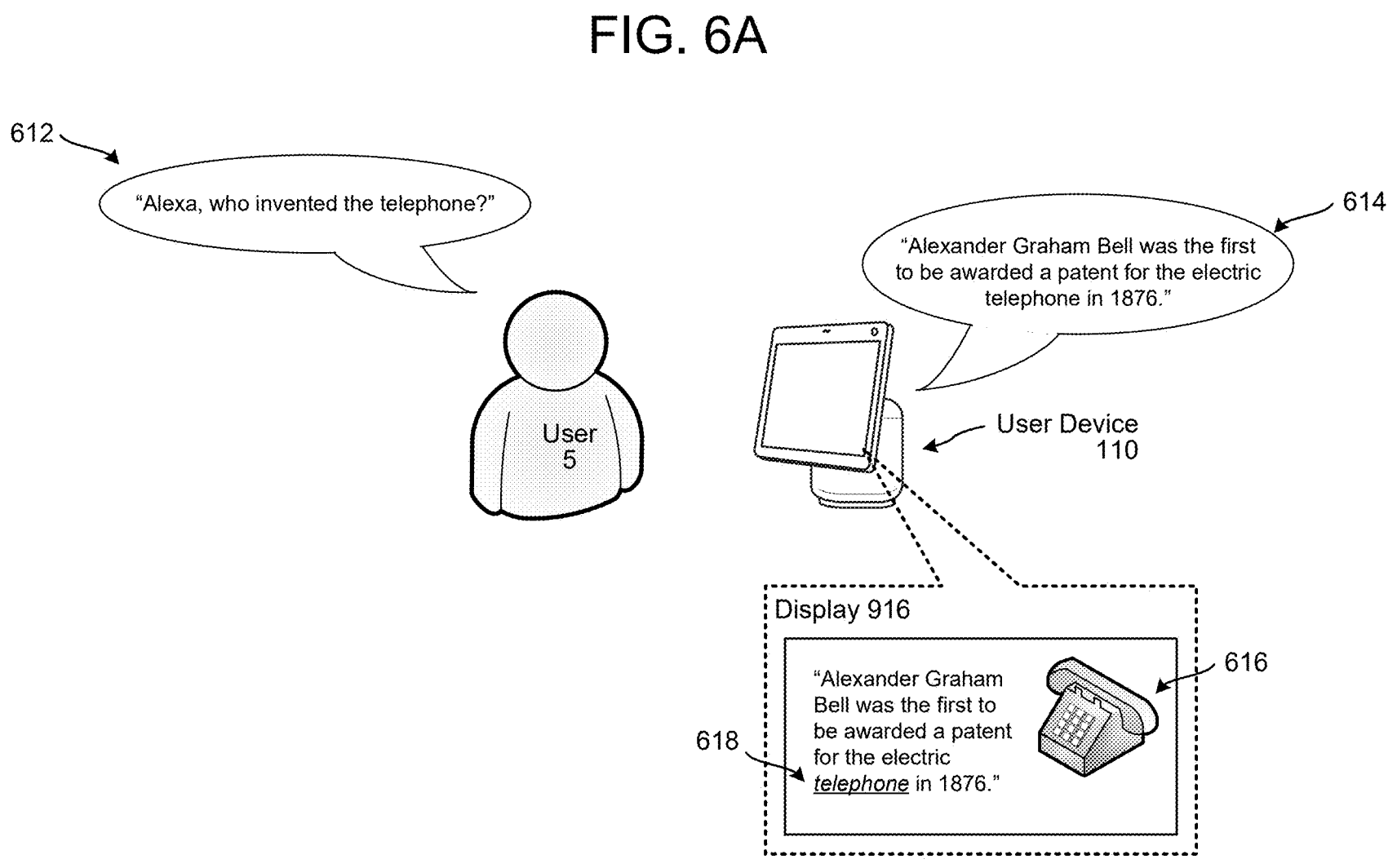

"Alexander Graham Bell was the first to be awarded a patent for the electric telephone in 1876."

User Device
110

616

Display 916

"Alexander Graham Bell was the first to be awarded a patent for the electric telephone in 1876."

618

User
5

612

"Alexa, who invented the telephone?"

FIG. 6B

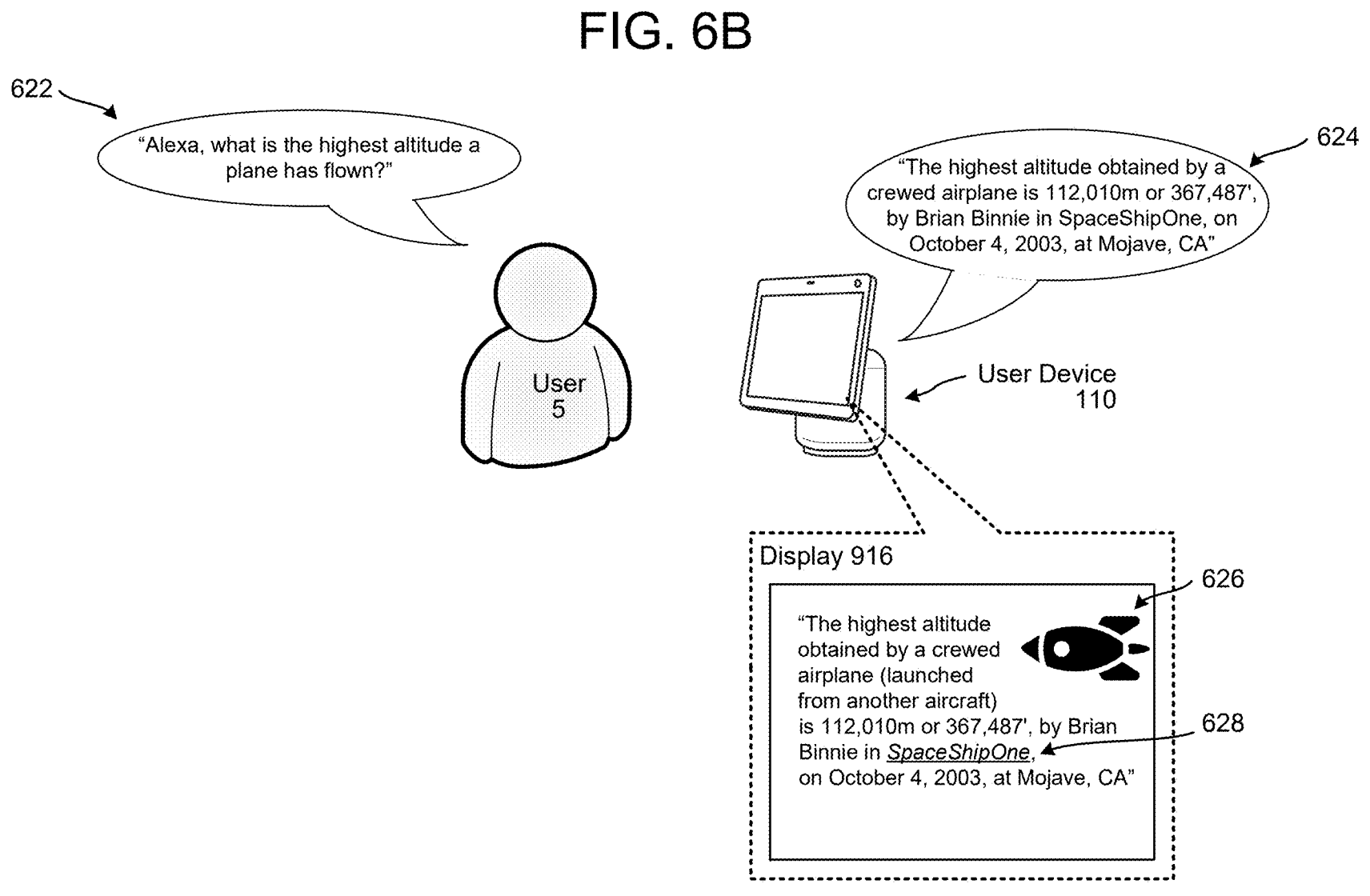

622 — "Alexa, what is the highest altitude a plane has flown?"

User 5

User Device 110

624 — "The highest altitude obtained by a crewed airplane is 112,010m or 367,487', by Brian Binnie in SpaceShipOne, on October 4, 2003, at Mojave, CA"

Display 916

626

628 — "The highest altitude obtained by a crewed airplane (launched from another aircraft) is 112,010m or 367,487', by Brian Binnie in *SpaceShipOne*, on October 4, 2003, at Mojave, CA"

700

Receive a user input
705

Process input to determine response
710

Recognize named entities in user input
and response
715

Determine entity embeddings
720

Determine context embedding
725

Predict entity salience scores
730

Augment
response?
735

No

Yes

Retrieve entity data
740

Use entity data to augment response
745

Output the response
750

FIG. 8

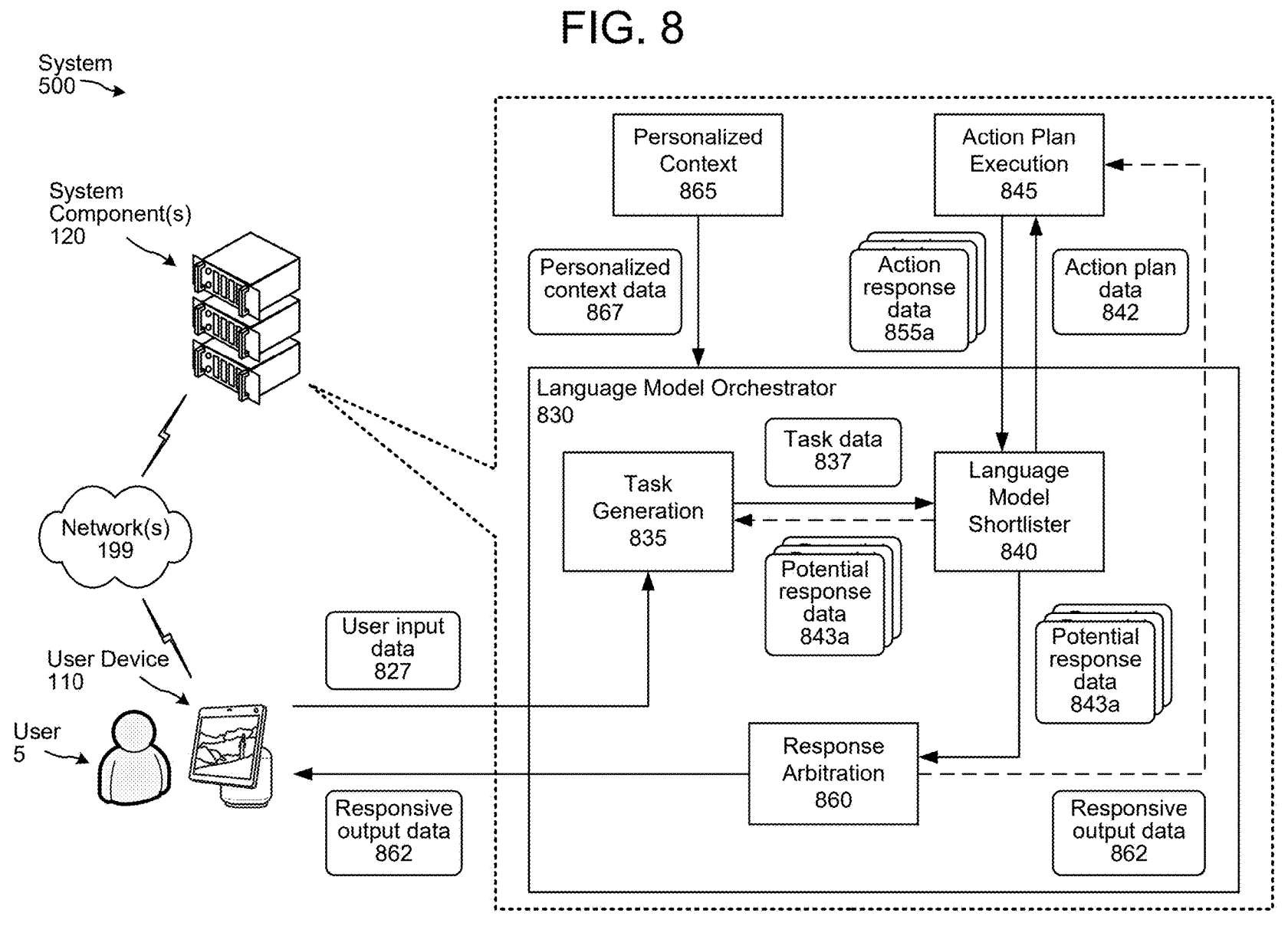

Action plan data 842

Action Plan Execution 845

Action response data 855a

Personalized Context 865

Personalized context data 867

Language Model Orchestrator 830

Task data 837

Potential response data 843a

Task Generation 835

Language Model Shortlister 840

Potential response data 843a

Response Arbitration 860

Responsive output data 862

System 500

System Component(s) 120

Network(s) 199

User Device 110

User 5

User input data 827

Responsive output data 862

Figure 10:
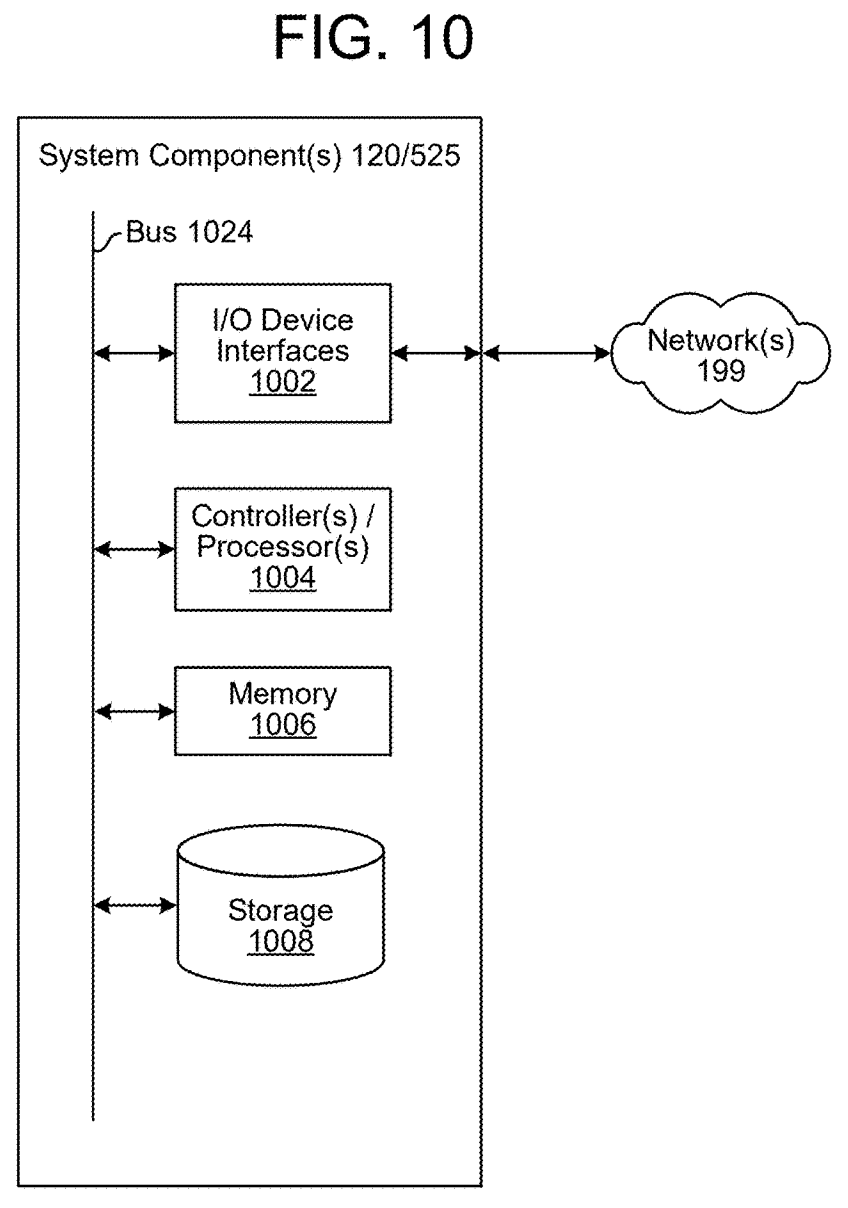

Network(s) 199

System Component(s) 120/525

Bus 1024

I/O Device Interfaces 1002

Controller(s) / Processor(s) 1004

Memory 1006

Storage 1008

PREDICTING ENTITY SALIENCE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 is a conceptual diagram illustrating components of a natural language processing system, according to embodiments of the present disclosure.

FIG. 6A illustrates a first example of a responsive output augmented using the entity salience model, according to embodiments of the present disclosure.

FIG. 6B illustrates a second example of a responsive output augmented using the entity salience model, according to embodiments of the present disclosure.

FIG. 8 is a conceptual diagram illustrating further example components and processing of the system configured to determine a response to a natural language user input, according to embodiments of the present disclosure.

FIG. 9 is a block diagram conceptually illustrating example components of a device, according to embodiments of the present disclosure.

FIG. 10 is a block diagram conceptually illustrating example components of a system, according to embodiments of the present disclosure.

DETAILED DESCRIPTION

Figure 1:
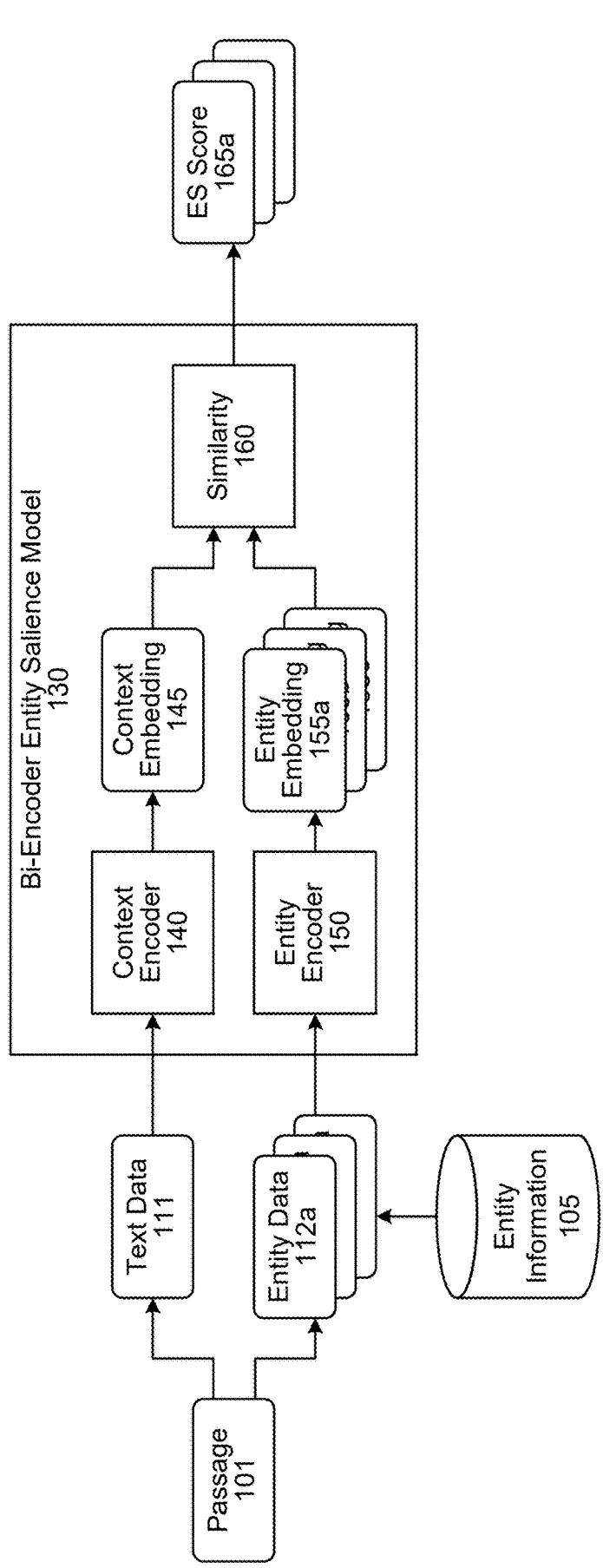
FIG. 1 is a conceptual diagram illustrating a system for predicting entity salience using a bi-encoder entity salience model, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech is a field of computer science, artificial intelligence, and linguistics in which embedding data is generated to represent speech in audio data and, using one or more models, the embedding data is processed to generate audio data and/or a system (e.g., API) command responsive to the speech. Language modeling (LM) is the use of various statistical and probabilistic techniques to determine the probability of a given sequence of words occurring in a sentence. LM can be used to perform various tasks including understanding a natural language input (e.g., when noise is present) and performing generative tasks that involve generating natural language output data. These technologies may be used individually and/or in combination as part of a natural language processing/virtual assistant system.

Natural language processing may include recognizing and resolving entities. An entity may be a real-world object that can be denoted with a proper name; for example, a person, location, organization, product, etc. Named-entity recognition (NER) is the task of identifying an entity or entities in unstructured text. Entity resolution is the task of identifying a data record corresponding to the identified entity.

Entity salience is a related natural language processing task that is concerned with determining which entities mentioned in a passage of text are most salient to the passage. Salience may refer to the centrality of an entity to the content of a text passage rather than the intrinsic importance of the entity beyond the text or its relevance to the perspective of a particular reader. A prediction of entity salience may be output as a salience score. One or more downstream processes may use the salience score to, for example, filter and/or rank NLU hypotheses, filter and/or rank possible answers to a question input by a user, augment an answer to the user question, identify content related to the user input and/or a system-generated response, etc.

A frequent challenge in applications that use entities extracted from text documents is selecting the most salient entity or entities when only a small number can be used by the application for one or more downstream purposes (e.g., displayed to a user). Solving this challenge is particularly difficult in the setting of extremely short documents, such as the response from a virtual assistant, where traditional signals of salience such as position and frequency are less likely to be useful.

Offered herein are techniques for improving entity salience prediction, particularly in the case of extremely short documents. The systems and methods described herein may use an embedding model applied to both the document and entities present therein. The model may be, for example, a bi-encoder entity salience model. The model may generate a context embedding from a passage representing part or all of the content of the document. The model may generate an entity embedding for each of one or more entities in the passage. The entity embedding may be determined by using an entity encoder to process the entity text and, in some cases, additional data corresponding to the entity. The model may calculate a similarity between the context embedding and an entity embedding to determine an entity salience score for that entity.

In some implementations, the system may augment the text representation of an entity with more information about the entity; for example, a description of the entity as retrieved from a data source. The entity description may be of varying length depending on resources available. When an entity is combined with its description in this manner, the input to the model may be referred to as entity feature text. In some implementations, the techniques may leverage a pre-trained language model to generate embeddings from the document and/or entities.

In some implementations, additional techniques may be used to improve performance of the entity salience model when, for example, little or no labeled training data is available. For example, a pre-trained sentence encoder may be fine-tuned on unlabeled in-domain data using a two-step semi-supervised training approach. A bi-encoder entity salience model leveraging the pre-trained sentence encoder may generate pseudo-labels for a training dataset. The pseudo-labeled training dataset may be used to train a cross-encoder teacher model. The cross-encoder teacher model may include a pre-trained language model that can receive the passage and entity feature text at the same time and apply a self-attention mechanism across both input sequences to improve entity salience prediction. The trained cross-encoder model may be used as a teacher model to train a new bi-encoder entity salience model and/or fine-tune the model used to generate the pseudo-labeled dataset.

These features may be implemented alone and/or in combination with each other and/or other features described herein. The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a system 100 for predicting entity salience using a bi-encoder entity salience model 130, according to embodiments of the present disclosure. The system 100 may include a bi-encoder entity salience model 130 ("salience model 130") configured to generate entity salience scores 165a, 165b, 165c, etc. (collectively: "salience scores 165") for entities represented in a passage 101 (e.g., a segment of text). The passage 101 may be a segment of text representing a natural language statement, command, request, response, question, answer, etc. In some cases, the passage 101 may represent a request and a response or a question and an answer, where the request/question was input by a user and the response/answer was generated by the system 100 (e.g., by a natural language processing system as described below with reference to FIGS. 5 and 8).

Entity salience is a natural language understanding task concerned with determining which entities mentioned in a passage of text are most salient to the passage. The salience may refer to the centrality of an entity to the content of a text rather than the intrinsic importance of the entity beyond the text or its relevance to the perspective of a particular reader. A salience score 165 may represent the salience of an entity to the passage 101. For example, the salience score 165 may be a value representing an importance (e.g., centrality) of the entity to the semantic content of the passage 101. The passage 101 may include several entities, each having some level of importance to the semantic content of the passage 101; however, some entities may be more central to the meaning of the passage 101 than others. For example, a user may ask "What was the first science fiction film?" and the natural language processing system may respond "According to Wikipedia, the first recorded science fiction film is 1902's A Trip to the Moon, directed by French filmmaker Georges Méliès. The film was inspired by a wide variety of sources, including Jules Verne's 1865 novel From the Earth to the Moon and its 1870 sequel Around the Moon." In this example, the passage 101 may include both the question and the answer. The passage 101 thus includes several entities including "A Trip to the Moon", "Georges Méliès", "Jules Verne", "From Earth to the Moon", and "Around the Moon." The system 100 may determine that the most salient entity is "A Trip to the Moon" due to it being the most direct answer to the question. Accordingly, the system may identify additional content to provide with the answer, such as an image representing the film. Additionally or alternatively, the system may add a hyperlink to the film title (e.g., the entity name) that would direct the user's browser to additional content about the movie. This example illustrates the benefit of selecting the most salient entity of the passage 101. Were the system to select a less salient entity for augmenting the answer, the user may become confused, and the user experience may suffer.

The salience model 130 may predict salience scores 165a, 165b, 165c, etc. by separately encoding the text of the passage 101 (e.g., text data 111) and entity data 112a, 112b, 112c, etc., representing the entities identified in the passage 101. In some implementations, the entity data 112 may represent the canonical entity name and/or the text of the entity mention as it appears in passage 101. In some implementations, the entity data 112 may additionally include information about the entity (e.g., a natural language description of varying length) retrieved from an entity information storage component 105. A context encoder 140 may process the text data 111 to determine content embedding data 145. The content embedding data 145 may be a vector or other data structure that represents, for example, the semantic content of the text data 111. Similarly, an entity encoder 150 may process the entity data 112 to determine entity embedding data 155; for example, first entity embedding data 155a may correspond to the first entity data 112a, the second entity embedding data 155b may correspond to the second entity data 112b, and the third entity embedding data 155c may correspond to the third entity data 112c, etc. In some implementations, the context encoder 140 and the entity encoder 150 may be the same model; for example, a neural network model based on a pretrained language model, sentence encoder, or the like. The entity embedding data 155 may also be a vector or other data structure that represents the entity name and/or a semantic meaning extracted from the description of the entity.

The salience model 130 may determine a salience score 165 for a particular entity based on a comparison of the context embedding data 145 for the passage 101 and the entity embedding data 155 for that entity. In some implementations, a similarity component 160 may quantify the similarity using one or more mathematical functions. For example, the similarity component 160 may determine an entity salience score 165 by calculating a cosine similarity between the context embedding data 145 and the entity embedding data 155. In some implementations, the similarity component 160 may output the raw result of the similarity calculation. In some implementations, the similarity component 160 may normalize the similarity scores 165 (e.g., to scale the entity scores 165 such that the largest is equal to 1) before outputting them.

In some implementations, the context encoder 140 and/or the entity encoder 150 may be based on a transformer neural network architecture. For example, one or both of the encoders may be pretrained as a sentence encoder to extract a semantic meaning from an input passage. This type of configuration may have the benefit of allowing flexibility with regard to the text used to represent the entity (e.g., the feature text) as entity data 112. For example, in a minimal approach, the entity data 112 may only include the entity name or mention text. Another approach may be to include a brief description of the entity appended (e.g., concatenated) to the entity name/mention text. The brief description may be a single sentence or paragraph as, for example, extracted from Wikipedia or other data source. In some implementations, the description may be longer; for example, up to and/or including an entire encyclopedia entry for the entity.

In some implementations, the context embedding data 145 and the entity embedding data 155 may be precalculated and cached (e.g., for frequently answered questions and/or common entities). Because the passage 101 and entities are encoded separately, the same embeddings may be used for determining the salience of different entities in different contexts. In some implementations, the cached embedding data 155 may be based on the entity description as well as the entity name/mention text.

Figure 2:
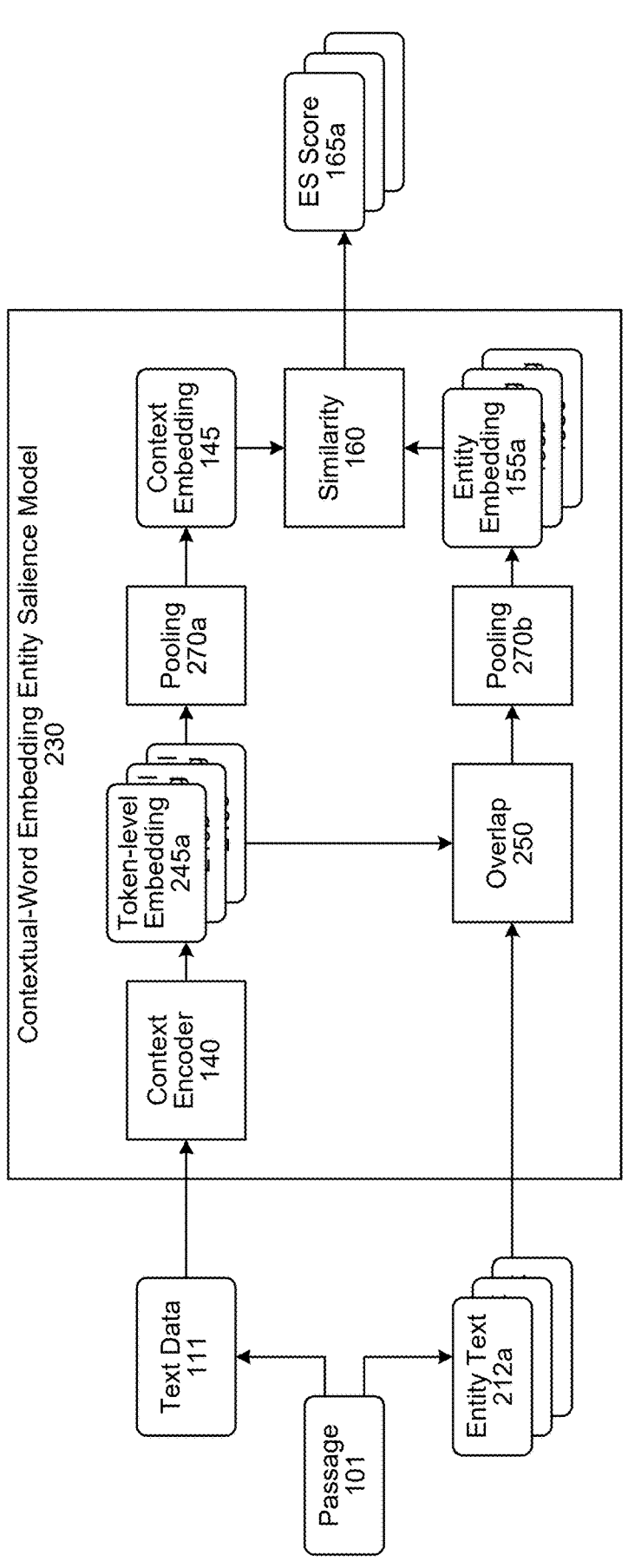
FIG. 2 is a conceptual diagram illustrating the system with a contextual-word embedding entity salience model, according to embodiments of the present disclosure.

FIG. 2 is a conceptual diagram illustrating the system 100 with a contextual-word embedding entity salience model 230, according to embodiments of the present disclosure. The entity salience model 230 may leverage the ability of a transformer neural network to extract the semantic meaning of an entity in a passage based on its surrounding context. Transformer neural networks have been demonstrated to effectively capture such semantic meaning in a variety of natural language processing tasks; for example, in machine translation. In the configuration shown in FIG. 2, the context encoder 140 may be or include a transformer neural network that generates token-level embedding data 245 for each phrase, word, subword, etc. represented in the text data 111 (e.g., as first token-level embedding data 245a, second token-level embedding data 245b, third token-level embedding data 245c, etc.). The token-level embedding data 245 corresponding to an entity mention may represent a semantic meaning of the entity mention in the context in which it is used. This configuration of the entity salience model 230 may determine entity embedding data 155 that better captures the semantic meaning of the entity mention as used in the passage 101 (e.g., in addition to quantifying the centrality of the entity to the passage as a whole). This configuration of the entity salience model 230 may also be more computationally efficient because it may be used without a separate encoding step for the entity feature text (e.g., entity text 212).

The entity salience model 230 may receive text data 111 and entity text 212 representing the passage 101. In some implementations, the entity text 212 may represent the text of the entity mention (e.g., in contrast with the entity data

112, which may include additional data such as a natural language description of the entity). The context encoder 140 may process the text data 111 to determine token-level embedding data 245. A first pooling component 270a may combine the token-level embedding data 245 for a passage 101 (e.g., a sentence, a question-answer pair, etc.) to determine content embedding data 145 representing the passage 101. In some implementations, the first pooling component 270a may implement an average pooling operation that calculates an arithmetic mean of the values in the token-level embedding data 245 for the passage 101 (e.g., outputting a context embedding vector having the same dimensionality as the token-level embedding vectors). In some implementations, the first pooling component 270a may implement a max pooling operation that outputs a vector in which each element represents the highest value at that position across the token-level embeddings for the passage 101.

An overlap component 250 may receive the token-level embedding data 245 and the entity text 212 for a passage 101, and determine an overlap between them. The entity text 212 may include first entity text 212a corresponding to the text of a first entity mention (e.g., the entity name), second entity text 212b corresponding to a second entity mention, third entity text 212c corresponding to a third entity mention, etc. The overlap component 250 may, for each entity mention in the passage 101, output the token-level embedding for the entity mention as determined by the context encoder 140. A second pooling component 270b may combine the token-level embeddings for the entity mentions to determine the entity embedding data 155. The second pooling component 270b may perform, for example, an average pooling operation or max pooling operation. Note that the first pooling component 270a processes the token-level embedding data 245a, 245b, 245c, etc., to determine the content embedding data 145 representing whole passage 101; thus, each entity salience score 165a, 165b, and 165c may be determined using the same context embedding data 145. In contrast, the second pooling component 270b generates distinct entity embedding data 155a, 155b, 155c, etc., for each entity mention in the passage 101; thus, each entity salience score 165 may be determined for each entity mention using the same context embedding data 145 and the particular entity embedding data 145 corresponding to that entity mention.

The similarity component 160 may receive the content embedding data 145 for the passage 101 and respective entity embedding data 155a, 155b, 155c, etc., corresponding to each entity mention in the passage 101, and, using the techniques described previously, determine a respective entity salience score 165a, 165b, 165c, etc., for each entity mention. During training and operation, the contextual-word embedding entity salience model 230 may function similarly to the bi-encoder entity salience model 130. Thus, where example systems are described as employing the entity salience model 130, the system may additionally or alternatively employ the entity salience model 230.

Figure 3:
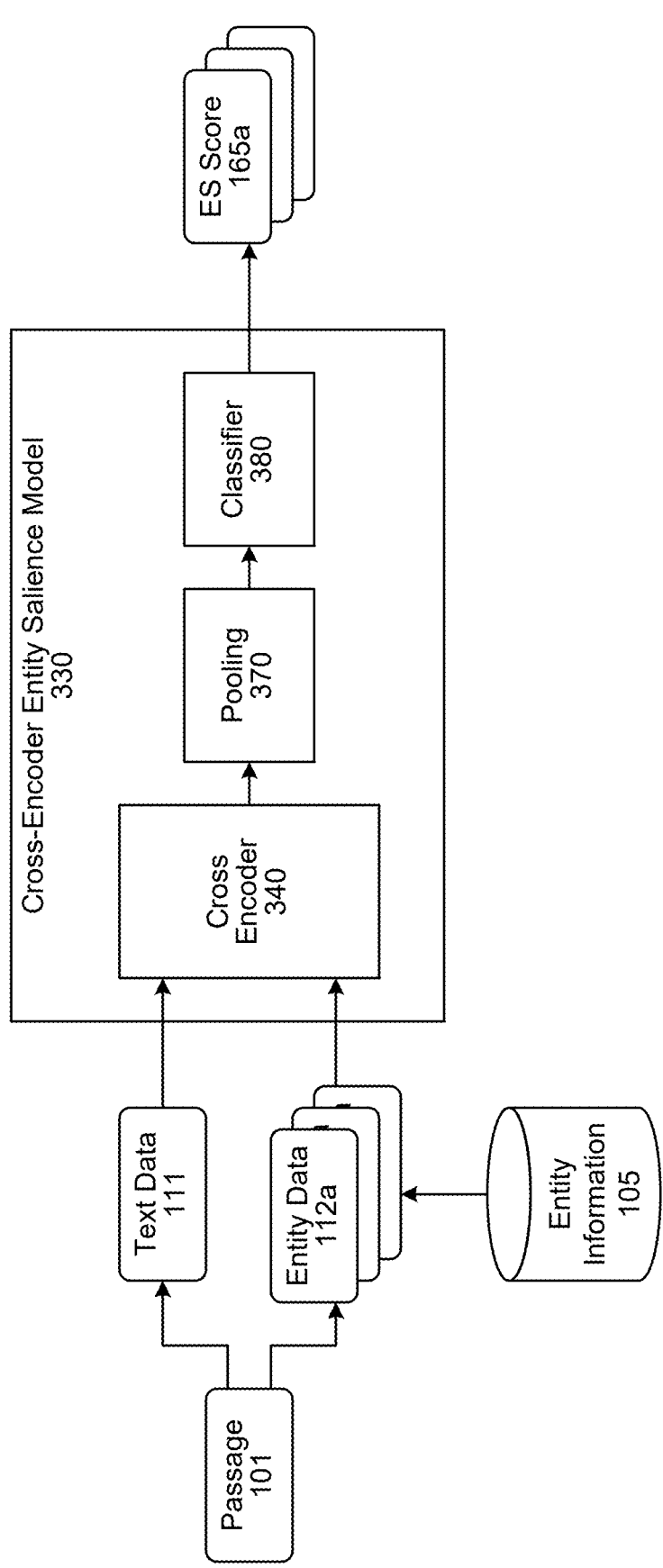
FIG. 3 is a conceptual diagram illustrating the system with a cross-encoder entity salience model, according to embodiments of the present disclosure.

FIG. 3 is a conceptual diagram illustrating the system 100 with a cross-encoder entity salience model 330, according to embodiments of the present disclosure. The cross-encoder entity salience model 330 may include a cross encoder 340 that may be or include, for example, a transformer neural network. In some implementations, the cross encoder 340 may include a large language model (LLM). For example, the cross encoder 340 may include a bidirectional encoder representations from transformers (BERT) model or variant thereof; for example, a robustly optimized BERT approach model (RoBERTa). In some implementations, the cross encoder 340 may be a sentence embedding model. A sentence embedding model may be trained by finetuning a pretrained language model to generate sentence embeddings that are similar (e.g., cosine similarity close to 1) for sentences that have similar meanings. Performance of a sentence embedding model may be improved by finetuning it using data specific to the domain in which it will be used. In cases where in-domain training data is limited, a bootstrap technique may be used to finetune the cross-encoder entity salience model 330 using a pseudo-labeled training dataset created using a bi-encoder entity salience model 130 as described below with reference to FIG. 4.

Returning to FIG. 3, The entity salience model 330 may receive a passage 101 and entity data 112 as input and generate a scalar output representing the salience score 165. In some implementations, the entity data 112 may represent the canonical entity name and/or the text of the entity mention, such as the mention of the entity in passage 101. In some implementations, the entity data 112 may additionally include information about the entity (e.g., a natural language description of varying length) retrieved from an entity information storage component 105.

The cross encoder 340 may process the text data 111 and the entity data 112. The cross encoder 340 may include one or more input layers to encode the text data 111 into tokenized embedding data. The cross encoder 340 may include another one or more input layers to encode the entity data 112 into tokenized embedding data. The cross encoder 340 may include a positional encoding mechanism that can add information about the position of tokens (e.g., representing the text data 111 and/or the entity data 112) within the passage 101. The cross encoder 340 may include an attention mechanism that may attend across the tokenized embedding data representing the text data 111 and the entity data 112. The attention mechanism may include a single- or multi-head attention component. The cross encoder 340 may include one or more feedforward layers to refine the output of the attention mechanism. The cross encoder 340 may include one or more features such as skip connections and/or normalization layers. In some implementations, the cross encoder 340 may include multiple "blocks", where a block may include an attention mechanism and feedforward layer(s). A first block may receive the tokenized embedding data, a second block will receive the output of the first block, and so on. The output of the last block may be output by the cross encoder 340. In some implementations, the cross encoder 340 may process the output of the last block using one or more additional feedfoward, linear, and/or projection layers before outputting token-level embedding data to a pooling component 370. The token-level embedding data output by the cross encoder 340 may be similar to the output of the context encoder 140; however, the output of the cross encoder 340 may be based on applying attention across the text data 111 and the entity data 112, in contrast to the context encoder 140, which does not attend to the entity data 112.

A pooling component 370 may perform a pooling operation on the token-level embedding data output by the cross encoder 340. In some implementations, the pooling component 370 may implement an average pooling operation that calculates an arithmetic mean of the values in the token-level embedding data for the text data 111 and entity data 112. In some implementations, the pooling component 370 may implement a max pooling operation that outputs a vector in which each element represents the highest value at that position across the token-level embeddings for the text data 111 and entity data 112. A classifier component 380 may process the pooled token-level embedding data, which may be a vector, and determine an entity salience score 165. The classifier component 380 may be, for example, a neural network configured to implement a linear projection to reduce the dimensionality of the vector to a scalar entity score 165.

During training and operation, the cross-encoder entity salience model 330 may function similarly to the bi-encoder entity salience model 130. Thus, where example systems are described as employing the entity salience model 130, the system may additionally or alternatively employ the entity salience model 330.

Figure 4:
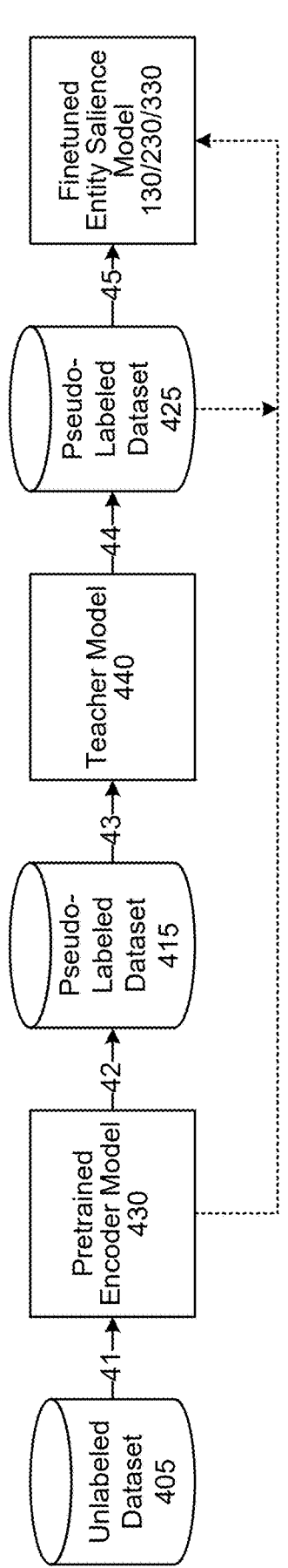
FIG. 4 is a conceptual diagram illustrating example operations for training the system, according to embodiments of the present disclosure.

FIG. 4 is a conceptual diagram illustrating example operations for training the system, according to embodiments of the present disclosure. Performance of the bi-encoder entity salience model 130 (and/or contextual-word embedding entity salience model 230 or cross-encoder entity salience model 330) may be improved by adapting it to the entity salience task and/or a target domain. If many labeled training examples are available, they may be used to directly fine-tune the entity salience model 130 via supervised learning. In practice, however, labeled training data may be limited. Thus, a semi-supervised approach may be used to bootstrap a teacher model 440 to label training examples which may be used to finetune the entity salience model 130. In some implementation, the teacher model 440 may be, for example, the cross-encoder entity salience model 330.

Thus, in some implementations, the entity salience model 130/230/330 may be trained in three stages. In a first stage, an entity salience model may be initialized with a pretrained encoder model 430 (e.g., a pretrained sentence embedding model). The initialized model may take advantage of semantic knowledge extractable from large volumes of unlabeled text data and existing supervised datasets for other tasks; for example, natural language inference. In some implementations, the initialized model may be a sentence-BERT (SBERT). The pretrained encoder model 430 may, at step 41, receive and process unlabeled training data 405. The unlabeled training data may include a number of context-entity pairs (e.g., passages with identified entity mentions). The pretrained encoder model 430 may determine pseudo labels (e.g., predicted entity salience scores) for the context-entity pairs and, at step 42, output pseudo-labeled training data 415 representing the context-entity pairs and the predicted entity salience scores.

In a second stage, the pseudo-labeled training data 415 may be used to train a teacher model 440. The teacher model 440 may be initialized with a larger, pretrained language model. The teacher model 440 may have an attention mechanism configured to attend to tokens (or embeddings encoded from the tokens) of the context and entities (e.g., text data 111 and entity data 112 of the context-entity pairs). The teacher model 440 may have a larger number of parameters and/or layers than, for example, a bi-encoder entity salience model 130, giving it greater capacity to capture salience relationships between the entity and context. In some implementations, the teacher model 440 may be initialized with a language model such as BERT or a variant thereof such as RoBERTa. The teacher model 440 may, at step 43, receive and process the pseudo-labeled training data 415. Training the teacher model 440 may include comparing the predicted entity salience scores in the pseudo-labeled training data 415 and entity salience scores predicted by the teacher model 440. In some implementation, parameters of the teacher model 440 may be updated based on, for example, a binary cross entropy loss calculated between the predicted entity salience scores and the target entity salience scores in the pseudo-labeled training data 415. The updated teacher model 440 may process the context-entity pairs in the pseudo-labeled training data 415 to determine new predicted entity salience scores and use them to output, at step 44, updated pseudo-labeled data 425.

In a third stage, the updated pseudo-labeled data 425 may be used to finetune the entity salience model 130/230/330. In some implementations, the updated pseudo-labeled data 425 may be used to finetune the pretrained encoder model 430. In some implementations, the updated pseudo-labeled data 425 may be used to finetune a different entity salience model; for example, a smaller model (e.g., fewer parameters and/or layers than the pretrained encoder model 430) suitable for deploying on a user device 110 (such as those shown in FIGS. 5, 9, and 11). In some implementations, the updated pseudo-labeled data 425 may be used to update a previous version of an entity salience model 130/230/330. In some implementations, the entity salience model 130 may be trained using a binary cross entropy loss similar to the training of the teacher model 440. In some implementations, the entity salience model 130 may be trained using multiple negative ranking loss (MNRL) with presumed positive examples. To perform MNRL, negative examples may be created by re-pairing entities with context from other context-entity pairs. In some implementations, only a subset of positive examples is used to finetune the entity salience model 130. For example, training examples may be chosen using based on exceeding a threshold predicted entity salience score or some other condition. The threshold and/or condition may be tuned as a hyperparameter. The finetuned entity salience model 130/230/330 may be used to determine entity salience scores with low latency; for example, based on a user question/system answer pair from a natural language processing system, just prior to output of the system-generated answer.

Figure 5:
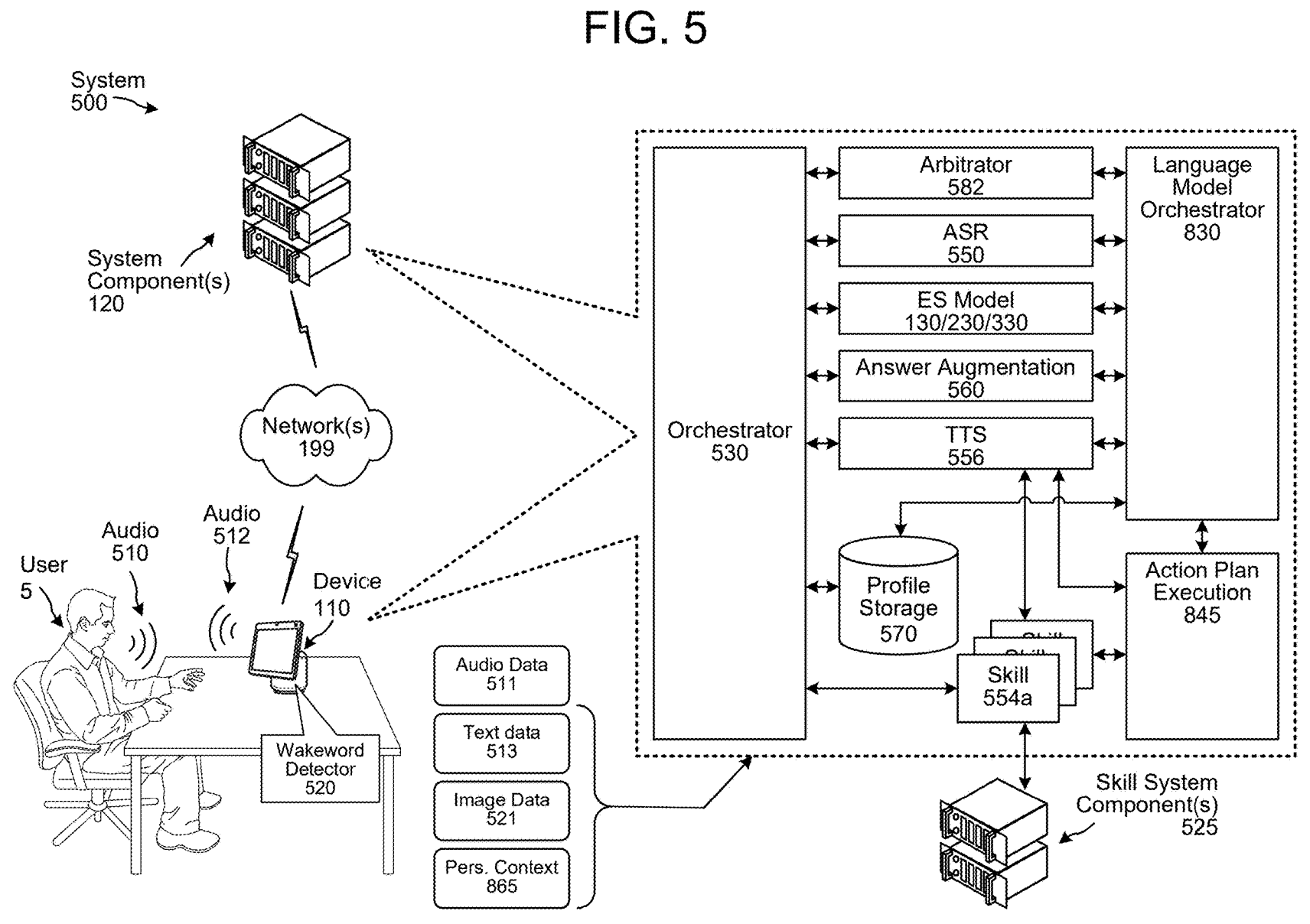

FIG. 5 is a conceptual diagram illustrating components of a natural language processing system 500, according to embodiments of the present disclosure. The natural language processing system 500 may employ various technologies such as ASR, NLU, NLG, TTS, and/or language modeling to function as a virtual assistant system. A user 5 may interact with the virtual assistant system using, for example, voice commands and/or natural language text inputs. The virtual assistant system may respond to user 5 commands using, for example, synthesized speech, natural language text on a display, and/or performing various actions for and/or on behalf of the user 5. For example, the user 5 may ask the natural language processing system 500, and the natural language processing system 500 may use the various natural language and speech processing technologies to process the question, determine response data (e.g., an answer), and output the response data (e.g., as synthesized speech and/or text). For example, the user device 110 may receive a user input in the form of audio data 511 and/or text data 513. The system 500 may process it to determine a response, which the user device 110 may output in the form of output audio 512 and/or text/images on a display 916. In some implementations, the system 500 may process the user input using an LLM natural language processing pipeline to generate responsive output data 862 based on user input data 827 as described in further detail below with reference to FIG. 8.

In some implementations, the natural language processing system 500 may augment the answer (e.g., using an answer augmentation component 560 described below) by, for example, presenting an image and/or audio related to an entity in the question and/or the answer. For example, if the user asks a question about a particular species of bird, the natural language processing system 500 may display a picture of the bird and/or play an audio clip of the bird's call. In some implementations, the natural language processing system 500 may provide a hyperlink to more information about the entity. The natural language processing system 500 may cause output of the answer and add a hyperlink to a mention of the entity. The user 5 may select the hyperlink to retrieve more information about the entity from an online resource (e.g., by directing a browser of the user device 110 to an online article or encyclopedia entry about the entity). The entity salience model 130 (and/or the entity salience model(s) 230/330), described previously, may aid answer augmentation by determining an entity or entities most central to the content of the question and/or answer. The answer augmentation component 560 may use the entity salience scores to identify data related to the entity, and by extension the question/answer, and augment the response data. Examples of answer augmentation are illustrated in FIGS. 6A and 6B.

Various components of the natural language processing system 500 are shown in FIG. 5. The various components may be located on same or different physical devices. Communication between various components may occur directly or across a network(s) 199. The user device 110 may include audio capture component(s), such as a microphone 920 or array of microphones of a user device 110, captures audio 510 and creates corresponding audio data. Once speech is detected in audio data representing the audio 510, the user device 110 may determine if the speech is directed at the user device 110/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 and may send image data 521 representing those image(s) to the system component(s). The image data 521 may include raw image data or image data processed by the user device 110 before sending to the system component(s). The image data 521 may be used in various manners by different components of the system to perform operations such as determining whether a user is directing an utterance to the system, interpreting a user command, responding to a user command, etc.

The wakeword detection component 520 of the user device 110 may process the audio data, representing the audio 510, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 510, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 110 may "wake" and begin transmitting audio data 511, representing the audio 510, to components of the user device 110 and/or the system component(s) 120 for processing. The audio data 511 may include data corresponding to the wakeword; in other embodiments, the portion of the audio corresponding to the wakeword is removed by the user device 110 prior to sending the audio data 511 to the system component(s) 120. In the case of touch input detection or gesture-based input detection, the audio data may not include a wakeword.

In at least some embodiments, the components of the user device 110 (e.g., on-device components) and the system component(s) 520 may have different processing capabilities. For example, on-device components may be configured to handle natural language user inputs may correspond to local-type natural language user inputs, such as those controlling devices or components associated with a user's home. In such circumstances the on-device components may be able to interpret and respond to a local-type natural language user input without incurring latency associated with sending data to and from the system component(s) 120. If the user device 110 attempts to process a natural language user input for which the on-device components are not necessarily best suited, the language processing results determined by the user device 110 may indicate a low confidence or other metric indicating that the processing by the user device 110 may not be as accurate as the processing done by the system component(s) 120.

In some embodiments, the user device may include a hybrid selector that may handle arbitration of on-device execution versus remote execution on the system component(s) 120. The hybrid selector may send the audio data 511 to the wakeword detection component 520. The wakeword detection component 520 may return an indication, that a wakeword was not detected. In response to receiving such an indication, the hybrid selector may refrain from sending the audio data 511 to the system component(s) 120, and may prevent the ASR component 550 of the user device 110 from further processing the audio data 511. In this situation, the audio data 511 can be discarded.

If the wakeword detection component 520 detects a wakeword in the audio data 511, the wakeword detection component 520 may send an indication of such detection to the hybrid selector. In response to receiving the indication, the hybrid selector may send the audio data 511 to the system component(s) 120 and/or the ASR component 550 of the user device 110. The hybrid selector (or other component) may associate a unique identifier with each natural language user input. The user device 110 may include the unique identifier when sending the audio data 511 to the system component(s) 120, and the response data from the system component(s) 120 may include the unique identifier to identify which natural language user input the response data corresponds. The hybrid selector may wait for response data from either or both of the system component(s) 120 or the local language processing component(s). The hybrid selector may control execution of local language processing, such as by sending "execute" and "terminate" events/instructions. An "execute" event may instruct a component of the user device 110 to continue any suspended execution (e.g., by instructing the component to execute on a previously determined intent in order to determine a directive). Meanwhile, a "terminate" event may instruct the component(s) of the user device 110 to terminate further execution, such as when the user device 110 receives directive data from the system component(s) 120 and the hybrid selector determines to execute the directive. The hybrid selector may thus prevent duplicated and/or erroneous handling of user inputs.

In some implementations, the system 500 may include more than one system component(s) 120. The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 520 may result in sending audio data to first system component(s) for processing while detection of the wakeword "Computer" by the wakeword detector may result in sending audio data to second system component(s) for processing. The system may have a separate wakeword and system for different skills/systems (e.g., "Gaming Central" for a game play skill/system component(s)) and/or such skills/systems may be coordinated by one or more skill components 554a, 554b, 554c, etc. (collectively "skill component(s) 554") of the user device 110 and/or system component(s) 120.

Upon receipt by the system 500, the audio data 511 may be sent to an orchestrator component 530 and/or the language model orchestrator component 830. The orchestrator component 530 may include memory and logic that enables the orchestrator component 530 to transmit various pieces and forms of data to various components of the system, as well as perform other operations as described herein. In some embodiments, the orchestrator component 530 may optionally be included in the system component(s) 120. In embodiments where the orchestrator component 530 is not included in the system component(s) 120, the audio data 511 may be sent directly to the language model orchestrator component 830. Further, in such embodiments, each of the components of the system component(s) 120 may be configured to interact with the language model orchestrator component 830, the action plan execution component 845, the API provider component, and/or other component(s).

In some embodiments, the system component(s) 120 may include an arbitrator component 582, which may be configured to determine whether the orchestrator component 530 and/or the language model orchestrator component 830 are to process with respect to user input data. In some embodiments, the language model orchestrator component 830 may be selected to process with respect to the audio data 511 only if the user 5 associated with the audio data 511 (or the user device 110 that captured the audio 510) has previously indicated that the language model orchestrator component 830 may be selected to process with respect to user inputs received from the user 5.

In some embodiments, the arbitrator component 582 may determine the orchestrator component 530 and/or the language model orchestrator component 830 are to process with respect to the audio data 511 based on metadata associated with the audio data 511. For example, the arbitrator component 582 may be a classifier configured to process a natural language representation of the audio data 511 (e.g., output by the ASR component 550) and classify the corresponding user input as to be processed by the orchestrator component 530 and/or the language model orchestrator component 830. For further example, the arbitrator component 582 may determine whether the device from which the audio data 511 is received is associated with an indicator representing the audio data 511 is to be processed by the orchestrator component 530 and/or the language model orchestrator component 830. As an even further example, the arbitrator component 582 may determine whether the user (e.g., determined using data output from a user recognition component) from which the audio data 511 is received is associated with a user profile including an indicator representing the audio data 511 is to be processed by the orchestrator component 530 and/or the language model orchestrator component 830. As another example, the arbitrator component 582 may determine whether the audio data 511 (or the output of the ASR component 550) corresponds to a request representing that the audio data 511 is to be processed by the orchestrator component 530 and/or the language model orchestrator component 830 (e.g., a request including "let's chat" may represent that the audio data 511 is to be processed by the language model orchestrator component 830).

In some embodiments, the arbitrator component 582 may send the audio data 511 to both of the orchestrator component 530 and the language model orchestrator component 830. The arbitrator component 582 may do so if it determines that a confidence score corresponding to whether the orchestrator component 530 and/or the language model orchestrator component 830 is to process the input is below a threshold. In such embodiments, the orchestrator component 530 and/or the language model orchestrator component 830 may include further logic for determining further confidence scores during processing representing whether the orchestrator component 530 and/or the language model orchestrator component 830 should continue processing, as is discussed further herein below.

The arbitrator component 582 may send the audio data 511 to an ASR component 550. In some embodiments, the component selected to process the audio data 511 (e.g., the orchestrator component 530 and/or the language model orchestrator component 830) may send the audio data 511 to the ASR component 550. The ASR component 550 may transcribe the audio data 511 into text data. The text data output by the ASR component 550 may represent one or more than one (e.g., in the form of an N-best list) ASR hypotheses representing speech represented in the audio data 511. In some implementations, the ASR component 550 may interpret the speech in the audio data 511 based on a similarity between the audio data 511 and pre-established language models. For example, the ASR component 550 may compare the audio data 511 with models for sounds (e.g., acoustic units such as phonemes, senons, phones, etc.) and sequences of sounds to identify words that match the sequence of sounds of the speech represented in the audio data 511. In some implementations, the ASR component 550 may process the audio data 511 using one or more DNN ASR models. An ASR model may be, for example, a recurrent neural network such as an RNN-T. The ASR model may predict a probability $(y|x)$ of labels $y=(y_1, \ldots, y_n)$ given acoustic features $x=(x_1, \ldots, x_t)$. During inference, the ASR model can generate an N-best list using, for example, a beam search decoding algorithm. The ASR model may include various neural networks and arithmetic components such as an encoder, a prediction network, a joint network, and a softmax. The encoder may be similar or analogous to an acoustic model and may process a sequence of acoustic input features to generate encoded hidden representations. The prediction network may be similar or analogous to a language model and may process the previous output label predictions, and map them to corresponding hidden representations. The joint network may be, for example, a feed forward neural network (NN) that may process hidden representations from both the encoder and prediction network, and predict output label probabilities. The softmax component may be a function implemented (e.g., as a layer of the joint network and/or a separate arithmetic block) to normalize the predicted output probabilities (e.g., such that the probabilities sum to 1). The ASR component 550 may send the text data to the arbitrator component 582, the orchestrator component 530, and/or the language model orchestrator component 830. In instances where the text data is sent to the arbitrator component 582, the arbitrator component 582 may send the text data to the component selected to process the audio data 511 (e.g., the orchestrator component 530 and/or the language model orchestrator component 830). The text data sent from the ASR component 550 to the arbitrator component 582, the orchestrator component 530, and/or the language model orchestrator component 830 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 530 may cause a NLU component (not shown) to perform processing with respect to the ASR data generated by the ASR component 550. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the user device 110, the system component(s) 120, a skill component 554, a skill system component(s) 525, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the user device 110. In another example, if the ASR data corresponds to "turn off the lights," the NLU component may determine an intent that the system turn off lights associated with the user device 110 or the user 5. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 530. The orchestrator component 530 may forward the NLU results data to a skill component(s) 554. If the NLU results data includes a single NLU hypothesis, the NLU component and the orchestrator component 530 may direct the NLU results data to the skill component(s) 554 associated with the NLU hypothesis. If the NLU results data includes an N-best list of NLU hypotheses, the NLU component and the orchestrator component 530 may direct the top scoring NLU hypothesis to a skill component(s) 554 associated with the top scoring NLU hypothesis. The system may also include a post-NLU ranker which may incorporate other information to rank potential interpretations determined by the NLU component.

In some embodiments, after determining that the orchestrator component 530 and/or the language model orchestrator component 830 should process with respect to the user input data 827, the arbitrator component 582 may be configured to periodically determine whether the orchestrator component 530 and/or the language model orchestrator component 830 should continue processing with respect to the user input data 827. For example, after a particular point in the processing of the orchestrator component 530 (e.g., after performing NLU, prior to determining a skill component 554 to process with respect to the user input data 827, prior to performing an action responsive to the user input, etc.) and/or the language model orchestrator component 830 (e.g., after selecting a task to be completed, after receiving the action response data from the one or more components, after completing a task, prior to performing an action responsive to the user input, etc.) the orchestrator component 530 and/or the language model orchestrator component 830 may query the arbitrator component 582 has determined that the orchestrator component 530 and/or the language model orchestrator component 830 should halt processing with respect to the user input data 827. As discussed above, the system 500 may be configured to stream portions of data associated with processing with respect to a user input to the one or more components such that the one or more components may begin performing their configured processing with respect to that data as soon as it is available to the one or more components. As such, the arbitrator component 582 may cause the orchestrator component 530 and/or the language model orchestrator component 830 to begin processing with respect to a user input as soon as a portion of data associated with the user input data 827 is available (e.g., the ASR data, context data, user recognition, etc.). Thereafter, once the arbitrator component 582 has enough data to perform the processing described herein above to determine whether the orchestrator component 530 and/or the language model orchestrator component 830 is to process with respect to the user input, the arbitrator component 582 may inform the orchestrator component 530 and/or the language model orchestrator component 830 to continue/halt processing with respect to the user input at one of the logical checkpoints in the processing of the orchestrator component 530 and/or the language model orchestrator component 830.

As discussed herein above, in some embodiments, the language model shortlister component 840 (e.g., via an API retrieval component and/or a shortlister language model) may be configured to select the orchestrator component 530 to process with respect to the user input and/or a current task to return action response data (e.g., the action response data 855a) representing a response to the user input/current task or a description of an action the orchestrator component 530 may cause to be performed in response to the user input/current task. As such, in some embodiments, although the language model orchestrator component 830 is determined to process with respect to a user input, the language model orchestrator component 830 may determine, during such processing, that the orchestrator component 530 should process with respect to the user input.

A skill system component(s) 525 may communicate with a skill/app component(s) 554 within the system component(s) 120 directly with the orchestrator component 530 and/or the action plan execution component 845, or with other components. A skill system component(s) 525 may be configured to perform one or more actions. An ability to perform such action(s) may sometimes be referred to as a "skill." That is, a skill may enable a skill system component(s) 525 to execute specific functionality in order to provide data or perform some other action requested by a user. For example, a weather service skill may enable a skill system component(s) 525 to provide weather information to the system component(s) 120, a car service skill may enable a skill system component(s) 525 to book a trip with respect to a taxi or ride sharing service, an order pizza skill may enable a skill system component(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 554 dedicated to interacting with the skill system component(s) 525. Unless expressly stated otherwise, reference to a skill, skill device, or skill component may include a skill component 554 operated by the system component(s) 120 and/or skill operated by the skill system component(s) 525. Moreover, the functionality described herein as a skill or skill may be referred to using many different terms, such as an action, speechlet, bot, app, or the like. The skill component 554 and or skill system component(s) 525 may return output data to the orchestrator component 530.

The user device 110 may include still image and/or video capture components such as a camera 918 or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 511 representing the commands to the system component(s) 120 for processing, after which the system component(s) 120 may return output data that can cause the user device 110 to engage its camera.

In at least some embodiments, the system component(s) 120 may receive the audio data 511 from the user device 110, process speech corresponding to a spoken input in the received audio data 511, and perform functions in response to the recognized speech. In at least some embodiments, these functions may involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may direct the user device 110 to output an audible response (e.g., using TTS processing performed by an on-device TTS component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

In at least some embodiments, the user device 110 may include, or be configured to use, one or more skill components that may work similarly to the skill component(s) 554 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 525. For example, a skill system component(s) 525 may be located in a remote environment (e.g., separate location) such that the user device 110 may only communicate with the skill system component(s) 525 via the network(s) 199. However, the disclosure is not limited thereto. For example, in at least some embodiments, a skill system component(s) 525 may be configured in a local environment (e.g., home server and/or the like) such that the user device 110 may communicate with the skill system component(s) 525 via a private network, such as a local area network (LAN).

The system component(s) includes a TTS component 556. The TTS component 556 may generate audio data (e.g., synthesized speech) from text data using one or more different methods. Text data input to the TTS component 556 may come from a skill component 554, the orchestrator component 530, or another component of the system. The TTS component 556 may include a preprocessing component for converting text data and/or other input data into a form suitable for processing using various TTS techniques. The preprocessing component may include functionality and/or components for performing text normalization, linguistic analysis, linguistic prosody generation, or other such operations. During text normalization, the preprocessing component may first process the text data and generate standard text, converting such things as numbers, abbreviations (such as Apt., St., etc.), symbols ($, %, etc.) into the equivalent of written out words. During linguistic analysis, a preprocessing component may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. The output of the preprocessing component may be a symbolic linguistic representation, which may include a sequence of phonetic units. The TTS component 556 may retrieve one or more previously trained and/or configured TTS models from a voice profile storage. A TTS model may be, for example, a neural network model that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. A TTS model may represent a particular speaker identity and may be conditioned based on speaking style, emotion, etc. In some implementations, a particular speaker identity may be associated with more than one TTS model; for example, with a different model representing a different speaking style, language, emotion, etc. in some implementations, a particular TTS model may be associated with more than one speaker identity; that is, be able to produce synthesized speech that reproduces voice characteristics of more than one character. Thus a first TTS model may be used to create synthesized speech for the first natural language processing system component(s) 120 while a second, different, TTS model may be used to create synthesized speech for the second natural language processing system component(s) 120. In some cases, the TTS model may generate the desired voice characteristics based on conditioning data received or determined from the text data and/or the other input data. In some implementations, the TTS component 556 may synthesize speech using method called unit selection. In unit selection, the TTS component 556 may match text data against a database of recorded speech. The TTS component 556 may select matching units of recorded speech and concatenate the units together to form audio data. In some implementations, the TTS component 556 may synthesize speech using method called parametric synthesis, the TTS component 556 may vary parameters such as frequency, volume, and noise to create audio data including an artificial speech waveform. The output of some speech synthesis techniques may include spectrogram data, which represents the energy content at each frequency band with a "frame" of audio data. A frame of audio data may represent several milliseconds (e.g., 10, 20, 30, etc.) of audio data. The TTS component 556 may convert spectrogram data to waveform data using a computerized voice generator, sometimes called a vocoder. The vocoder may be, for example, a universal neural vocoder based on Parallel WaveNet or related model. The vocoder may take as input audio data in the form of, for example, a Mel-spectrogram with 80 coefficients and frequencies ranging from 50 Hz to 12 kHz. The vocoder may process the spectrogram data and convert it to a time-domain audio format (e.g., pulse-code modulation (PCM), waveform audio format (WAV), μ-law, etc.) that may be readily converted to an analog signal for amplification and output by a loudspeaker. The resulting audio data may consist of, for example, 8-, 16-, or 24-bit audio having a sample rate of 16 kHz, 24 kHz, 44.1 kHz, etc. In some implementations, other bit and/or sample rates may be used. A digital-to-analog convertor (DAC) may convert the audio data to an analog signal suitable for amplification and output as audio 512 by a loudspeaker such as a speaker 912 of the user device 110.

The system 500 may include the answer augmentation component 560. The answer augmentation component 560 may receive response data generated by a skill component 554, language model orchestrator component 830, and/or other component with NLG capabilities. The response data may include one or more named entities, which may have been flagged by, for example, the NLG component that generated the response data. The answer augmentation component 560 may also receive a representation of the user input with named entities flagged using, for example, a named entity recognition component/process. The entities may be associated with entity salience scores generated by the entity salience model 130. In some cases, the entity salience scores may be received with the user input data/response date. In some cases, the answer augmentation component 560 may send the user input data/response data to the entity salience model 130 for processing (e.g., as a passage 101). The answer augmentation component 560 may include a combination of software and/or hardware configured to identify a most salient entity or entities, and augment the response data with additional data. The additional data may be, for example, media data such as an image and/or audio. The additional data may be, for example a link (e.g., uniform resource locator ("URL") and/or hyperlink) to an online resource such as a webpage. The answer augmentation component 560 may include one or more machine learning models configured to identify additional data using the entity, user preferences (e.g., retrieved from a profile storage 570), and/or system policies that indicate which entities/categories of entities should be augmented with additional data and/or what formats of additional data should be used to augment the response data. The answer augmentation component 560 may include and/or interface with one or more knowledge graphs that include and/or indicate additional data about various entities. In some cases, the answer augmentation component 560 may modify the response data to include the additional data. In some cases, the answer augmentation component 560 may provide the additional data with the response data (e.g., as a separate directive). In some implementations, the answer augmentation component 560 may receive feedback signals based on user interaction with the additional data. For example, the feedback data may include information about whether and/or how long a user 5 viewed/listened to the additional data, whether the user 5 selected a hyperlink, and/or whether the user 5 "liked," "disliked," or otherwise indicated that a particular type of additional data should not be provided or that no additional data should be provided.

The system 500 (either on user device 110, system component(s) 120, or a combination thereof) may include profile storage 570 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more internet protocol (IP) addresses, medium access control (MAC) addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 5 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. Furthermore, various components shown in FIG. 5 and/or the functions they perform may be duplicated, divided, and/or shared between the system component(s) 120 and user device 110.

FIG. 6A illustrates a first example of a responsive output augmented using the entity salience model 130, according to embodiments of the present disclosure. The user 5 may speak to the user device 110 to ask a question 612, "Alexa, who invented the telephone." The system 500 (e.g., components of the user device 110 and/or the system component(s) 120) may process the speech, identify the question, and generate a natural language response (e.g., an answer). For example, the system 500 may generate the answer 614, "Alexander Graham Bell was the first to be awarded a patent for the electric telephone in 1876." The system 500 may process the question 612 and answer 614 using the entity salience model 130 to determine which entity or entities are most central to the content of the question and answer. The question 612 and answer 614 may include entities such as "telephone," "Alexander Graham Bell," "patent", "electric telephone," "1876," etc. The entity salience model 130 may determine entity salience scores for each entity. The entity salience model may identify "telephone" as the focal entity for the question 612 and answer 614. The system 500 may send the entity salience scores and the response data to the answer augmentation component 560 for augmentation. The answer augmentation component 560 may identify additional data about the entity "telephone" using, for example, one or more knowledge graphs. The additional data may include an example image of a telephone, a URL to an online resource with further information about telephones, etc. The user device 110 may output the answer 614 in the form of synthesized speech and/or as text on the display 916. In this example, the output the answer with the image of the telephone 616 and a hyperlink added to the named entity "telephone" 618.

This example illustrates the importance of properly determining entity salience for a passage 101 (e.g., the question 612/answer 614 pair). An image of a patent or the United States' centennial celebration (occurring in 1876), or a hyperlink to Thomas Edison's mimeograph (also patented in 1876) may have been less relevant to the question 612, less useful to the user 5, and perhaps even confusing.

FIG. 6B illustrates a second example of a responsive output augmented using the entity salience model, according to embodiments of the present disclosure. The user 5 may ask the question 622, "Alexa, what is the highest altitude a plane has flown?", and the system 500 may generate the answer 624, "The highest altitude obtained by a crewed airplane is 112,010 m or 367,487', by Brian Binnie in SpaceShipOne, on Oct. 4, 2003, at Mojave, CA". In this example, the system 500 may extract four entities from the question/answer pair: "Brian Binnie," "SpaceShipOne," "Mojave," and "California." The entity salience model 130 may determine that "SpaceShipOne" is the most salient, and that the others are less salient. The system 500 can create the best user experience by properly selecting the focal entity and using that for augmentation and exploration. Accordingly, the system 500 may augment the response data by presenting an image of SpaceShipOne (represented by the image of the rocket 626) on the display 916. Additionally or alternatively, the system 500 may apply a URL to the entity mention 628 "SpaceShipOne" that links to an online resource with additional information about the craft. Selecting one of the less salient entities such as "Mojave" or "California" could lead to less satisfying user experience.

Figure 7:
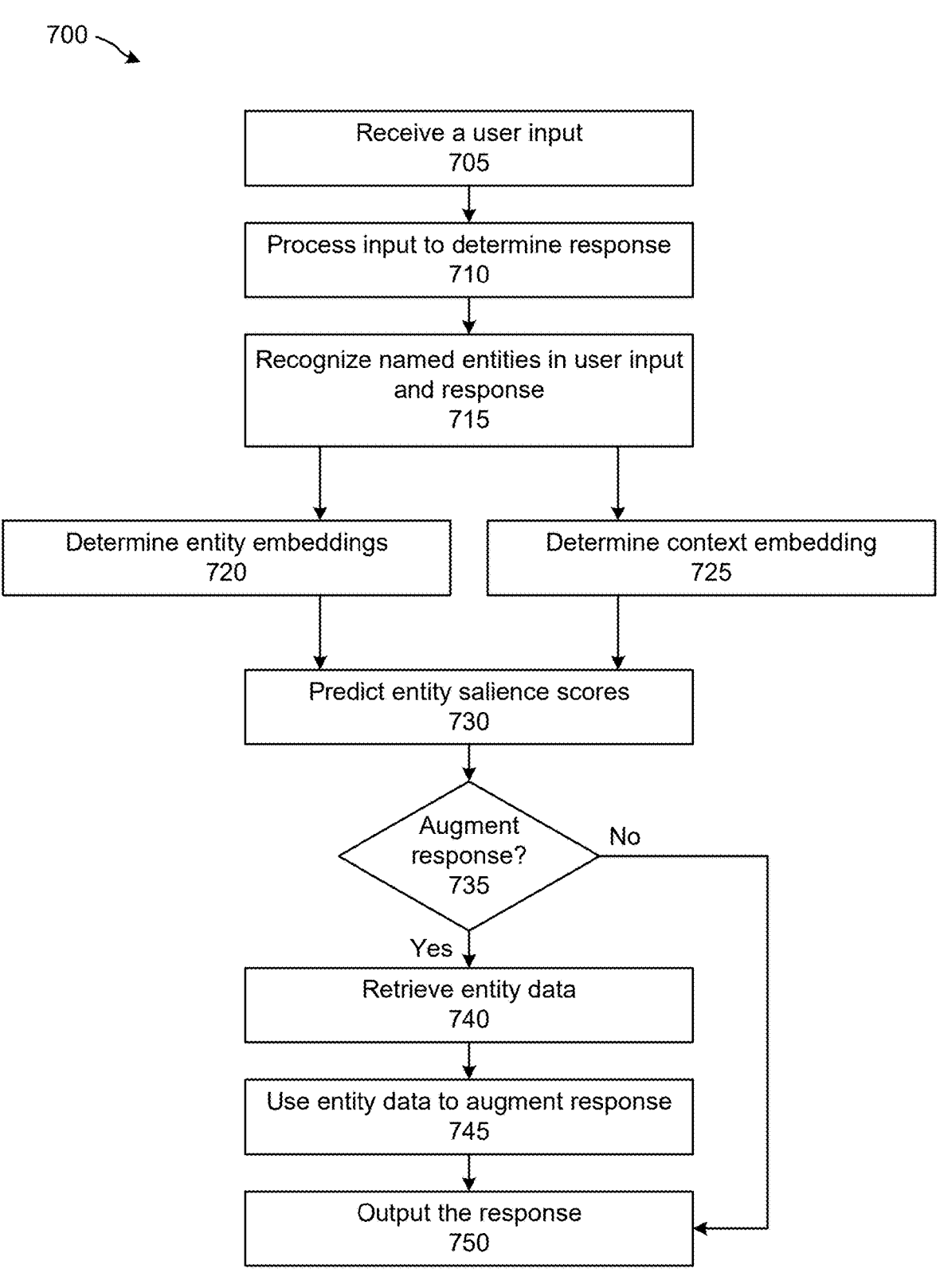
FIG. 7 is a flowchart illustrating example operations of the natural language processing system incorporating entity salience prediction, according to embodiments of the present disclosure.

FIG. 7 is a flowchart illustrating example operations 700 of the natural language processing system 500 incorporating entity salience prediction, according to embodiments of the present disclosure. The operations 700 may include the system 500 determining a potential response to a user input, predicting the salience of one or more entities in the input and/or response, and configuring the potential response based on the entity salience prediction. The operations 700 may include receiving (705) a user input. The user input may be a natural language input received in the form of text data and/or audio data (e.g., speech). The operations 700 may include processing (710) the user input. The system 500 may process the user input using one or both of the LLM path (e.g., as handled by the language model orchestrator component 830) or the non-LLM natural language processing path (e.g., as handled by the orchestrator component 530). The system 500 may generate response data that may be in the form of natural language for output as text and/or synthesized speech. In some cases, the input and response may be a question posed by the user and an answer determined/generated by the system. In some cases, the input may be a prompt (e.g., such as to a generative language model) and the output may be the response. In some cases, the response may system-initiated (e.g., not corresponding to an immediately preceding input but rather one received possibly days or weeks before), such as a news alert requested by the user. In any case, the operations 700 may include recognizing (715) named entities in the response data and/or input data. The named entities may be recognized using, for example, a named entity recognition (NER) process. The system 500 may additionally resolve the named entities to identify known entities (e.g., as uniquely represented in a knowledge graph). Once the named entities have been recognized and resolved, the entity salience prediction system 100 may determine a salience score for each entity.

The entity salience prediction system 100 may determine entity embeddings using the techniques described previously with reference to FIGS. 1 through 3. The operations 700 may include determining (725) a context embedding for the user input and/or system response. The operations 700 may include determining (720) entity embeddings for each entity identified from the user input and/or system response. In some implementations, an entity embedding may be determined using only the entity mention itself (e.g., the entity text). In some implementations, the entity embedding may be determined using the entity mention and a natural language description of the entity. In some implementations, the entity embeddings may be determined using token-level embeddings determined by a context encoder. The operations 700 may include predicting (730) entity salience scores using the context embedding and the entity embeddings. The system 100 may predict an entity salience score by comparing the entity embedding to the context embedding (e.g., as shown in FIGS. 1 and 2) and/or using an attention mechanism (e.g., as shown in FIG. 3).

The operations 700 may include determining (735) whether to augment the response; for example with additional data regarding one of the identified entities. The system 500 may make this determination based on one or more of various factors including: user preferences (e.g., whether the user has toggled a setting to withhold answer augmentation), a confidence associated with the input and/or response (e.g., a predicted likelihood that the system determined the question properly and/or that the response represents a correct answer), an entity score or scores (e.g., whether the system 100 was able to identify one most salient entity and/or whether the entity salience score exceeds a threshold or meets some other condition), and/or the entity itself (e.g., whether it is associated with additional information in a knowledge graph and/or whether the system 500 has previously identified that entity as appropriate/not appropriate for augmentation), etc. If the system 500 determines not to augment the answer ("No" at 735), the operations 700 may proceed to the stage 750 and output the response.

If the system 500 determines to augment the answer ("Yes" at 735), the operations 700 may proceed to the stage 740. The operations 700 may include retrieving (740) entity data from, for example, one or more knowledge graphs. The operations 700 may include using the entity data to augment (745) the response with additional media, information, and/or links to additional resources about the entity. The operations 700 may include outputting (750) the response; for example, by causing a user device 110 to present the response data and/or any additional data.

FIG. 8 is a conceptual diagram illustrating further example components and processing of the system 500 configured to determine a response to a natural language user input, according to embodiments of the present disclosure. As shown in FIG. 8, the system may include a user device 110, local to a user 5, in communication with a system component(s) 120 via a network(s) 199. The network(s) 199 may include the Internet and/or any other wide- or local-area network, and may include wired, wireless, and/or cellular network hardware.

The system component(s) 120 may include various components, such as the language model orchestrator component 830, a personalized context component 865, and the action plan execution component 845. The language model orchestrator component 830 may include a task generation component 835, a language model shortlister component 840, and a response arbitration component 860. In some embodiments, the language model orchestrator component 830 may correspond to a language model after completion of its training. In other embodiments, one or more of the task generation component 835, the language model shortlister component 840 or the response arbitration component 860 may correspond to the language model after completion of its training.

In some embodiments, the language model orchestrator component 830 may generate prompt data representing a prompt for input to the language models. As shown in FIG. 8, the system component(s) 120 receive user input data 827, which may be provided to the language model orchestrator component 830. As discussed above, in some instances, the user input data 827 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 830 receiving the user input data 827, another component (e.g., an automatic speech recognition (ASR) component 550) of the system 100 may receive audio data representing the user input. The ASR component 550 may perform ASR processing on the audio data to determine ASR data corresponding to the user input, which may correspond to a transcript of the user input. As described above, with respect to FIG. 5, the ASR component 550 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 550 level of confidence that the corresponding hypothesis represents what the user said. The ASR component 550 may also determine token scores corresponding to each token/word of the ASR hypothesis, where the token score indicates the ASR component's 550 level of confidence that the respective token/word was spoken by the user. The token scores may be identified as an entity score when the corresponding token relates to an entity. In some instances, the user input data 827 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 827).

In some embodiments, the language model orchestrator component 830 may receive input data, which may be processed in a similar manner as the user input data 827 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 110 (e.g., a smartphone, a smart speaker, etc.) to present an alert to the user. The language model orchestrator component 830 may process the input data to generate tasks that may cause the foregoing example actions to be performed.

The user input data 827 may be received at the task generation component 835 of the language model orchestrator component 830, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100). For example, for a user input of "How is today's weather looking," the task generation component 835 may generate a list of tasks of "(1) determine current outside temperature from thermostat; and (2) determine weather forecast for today" and select the task of "determine weather forecast for today" to be completed first. In instances where the task generation component 835 generates more than one task to be completed in order to perform the action responsive to the user input, the task generation component 835 may further maintain and prioritize the list of tasks as the processing of the system 100 with respect to the user input is performed. In other words, as the system 100 processes to complete the list of tasks, the task generation component 835 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 835 may generate and send task data 837 representing the selected task to be completed and various other information needed to perform further processing with respect to the task (e.g., the user input data 827, an indication of the selected task, potential responses associated with previous tasks, the remaining task(s), and context data associated with the user input data 827) to the language model shortlister component 840.

The language model shortlister component 840 may be configured to determine one or more components (e.g., responding component, such as APIs, skill component(s) 554, language model agent component(s), TTS component 556, etc.) configured to perform an action related to the user input or the current task. The language model shortlister component 840 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the language model shortlister component 840 may generate requests of "use Weather Application A to determine weather forecast for today" and "use Weather Application B to determine weather forecast for today," or the like. Such requests may be represented in the action plan data 842 sent to the action plan execution component 845. The action plan execution component 845 may identify the request(s) in the action plan data 842, generate executable API calls corresponding to the request(s), and cause the corresponding components (e.g., the responding component, such as the API provider component, the language model agent component, the skill component 554, the TTS component 556, etc.) to generate action response data 855*a-n* representing the requested potential response(s), where individual action response data 855*a* may be provided by/correspond to a particular responding component-one of the API provider component, the language model agent component, the skill component 554, and/or the TTS component 556. In some embodiments, the action response data 855*a-n* may include an identifier (e.g., a component name, an alphanumerical value associated with the component, etc.) for the component providing the data. The language model shortlister component 840 receives and processes the action response data 855*a-n* and generates potential response data 843*a-n* representing the potential response(s) (e.g., relevant potential responses, selected potential responses, ranked potential responses, etc.) for further processing. If the language model shortlister component 840 determines that there are no remaining tasks to generate potential responses for, the language model shortlister component 840 may send the potential response data 843*a-n* to the response arbitration component 860.

The potential response data 843*a-n*, in some embodiments, may be determined based on receiving potential responses from various different components that may be relevant in responding to the user input data 827. For example, the potential response data 843*a-n* may include a first potential response from a first component configured to perform a first task determined by the task generation component 835 (e.g., the responding component), a second potential response from a second component configured to perform a second task determined by the task generation component 835 (e.g., the responding component), etc. The potential response data 843*a-n* can include more than one potential response relating to an individual task. In some embodiments, the potential response data 843*a-n* may be natural language data.

The response arbitration component 860 processes the potential response data 843*a-n* to determine whether the potential responses generated for the one or more tasks are responsive to the user input. The response arbitration component 860 processes the potential response data 843*a-n* (representing at least the generated potential responses) and selects one or more of the potential responses that are determined to be responsive to the user input and/or determines that none of the actions are responsive to the user input. For example, the response arbitration component 860 may process the potential response data 843*a-n* to determine if one or more of the potential responses performable by the API(s) (e.g., the potential responses and/or potential actions) are responsive to the current task. In some embodiments, the response arbitration component 860 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 860 may generate a natural language summary of "The weather for today is expected to be mostly sunny with a high of 75 and a low of 68 and a slight chance of rain in the evening," or the like. In some embodiments, where the language model orchestrator component 830 determines a personality that is relevant to the user input, the response arbitration component 860 may further generate the natural language summary to be in a style corresponding to the personality.

In some embodiments, the language models (e.g., the language model orchestrator component 830, the task generation component 835, the language model shortlister component 840, and the response arbitration component 860) may be fine-tuned to perform a particular task(s). Fine-tuning of the language models (e.g., the language model orchestrator component 830, the task generation component 835, the language model shortlister component 840, and the response arbitration component 860) may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the task generation component 835 and/or the language model shortlister component 840 indicates that additional information is needed to complete a first task associated with a user input, a request for the additional information may be sent to the personalized context component 865 (which may be returned as personalized context data 867). Thereafter, the task generation component 835 and/or the language model shortlister component 840 may continue to process to complete their configured operations. For example, while the personalized context component 865 is processing to determine the additional information, the system 100 may begin processing with respect to a second task associated with the user input. Thereafter, the output of the personalized context component 865 may be sent to the response arbitration component 860 such that once the response arbitration component 860 receives the output of the language model shortlister component 840, the response arbitration component 860 may resolve the ambiguity that resulted in the request for additional information in order to generate the responsive output data 862. For further example, if the user input data 827 is generated to include the natural language representation of the user input, but the processing required to determine the corresponding contextual signals (e.g., weather data, time of data, dialog history, device information, etc.) is yet to be completed, the task generation component 835 may begin processing with respect to the natural language representation of the user input. Once the corresponding contextual signals have been generated, the task generation component 835 may begin processing with respect to the contextual signals and may update downstream components with the result of the processing with respect to the contextual signals.

As another example, if the task generation component 835 determines that more than one task is to be completed to perform an action responsive to a user input, and the language model shortlister component 840 processes as described herein above to cause one or more components to generate potential responses with respect to a first task of the more than one tasks, the language model shortlister component 840 may send the potential responses (and a representation of the user input and the current task) to the response arbitration component 860 to process as described herein above with respect to those potential responses while the system 100 (e.g., the task generation component 835 and/or the language model shortlister component 840) completes processing with respect to the remaining tasks of the one or more tasks. Therefore, the response arbitration component 860 may process as described herein to select between the potential responses associated with the first task while the potential responses associated with one or more of the remaining tasks is completed. As such, the response arbitration component 860 may only need to arbitrate between the potential responses associated with the first task that were previously selected by the response arbitration component 860 as being responsive to the first task when the response arbitration component 860 later processes with respect to further potential responses associated with further tasks.

Figure 9:
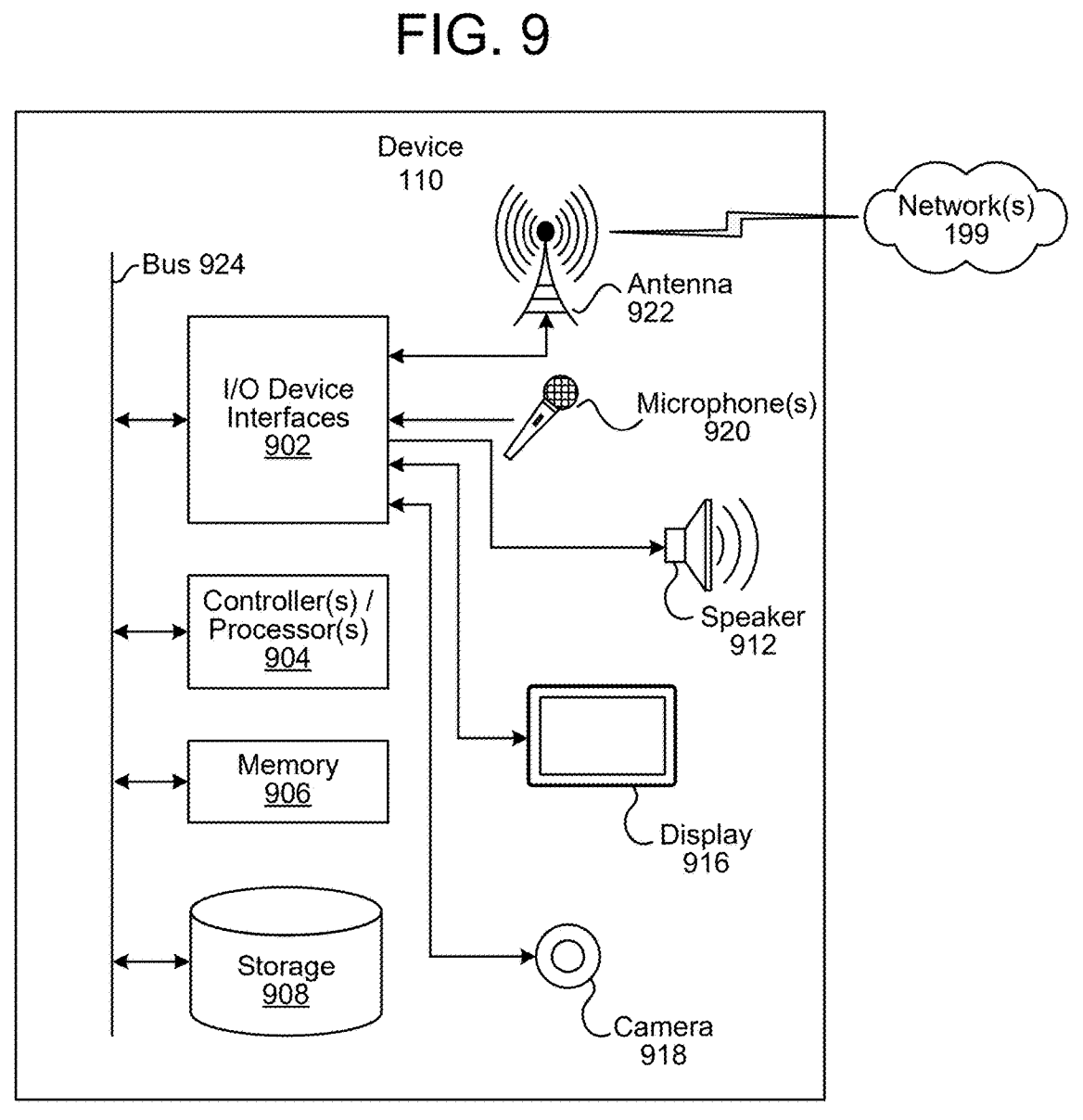

FIG. 9 is a block diagram conceptually illustrating a device 110 that may be used with the system. FIG. 10 is a block diagram conceptually illustrating example components of a remote device, such as the natural language command processing system component(s), which may assist with ASR processing, NLU processing, etc., and a skill system component(s) 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). A system component 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/525) may be included in the overall system 100 of the present disclosure, such as one or more natural language processing system component(s) 120 for performing ASR processing, one or more natural language processing system component(s) 120 for performing NLU processing, one or more skill system component(s) 525, etc. In operation, each of these systems may include computer-readable and computer-executable instructions that reside on the respective device (120/525), as will be discussed further below.

Each of these devices (110/120/525) may include one or more controllers/processors (904/1004), which may each include a central processing unit (CPU) for processing data and computer-readable instructions, and a memory (906/1006) for storing data and instructions of the respective device. The memories (906/1006) may individually include volatile random-access memory (RAM), non-volatile read only memory (ROM), non-volatile magnetoresistive memory (MRAM), and/or other types of memory. Each device (110/120/525) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (902/1002).

Computer instructions for operating each device (110/120/525) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/525) includes input/output device interfaces (902/1002). A variety of components may be connected through the input/output device interfaces (902/

1002), as will be discussed further below. Additionally, each device (110/120/525) may include an address/data bus (924/1024) for conveying data among components of the respective device. Each component within a device (110/120/525) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language command processing system component(s), or a skill system component(s) 525 may include their own dedicated processors, memory, and/or storage. Alternatively, one or more of the components of the device(s) 110, the natural language command processing system component(s), or a skill system component(s) 525 may utilize the I/O interfaces (902/1002), processor(s) (904/1004), memory (906/1006), and/or storage (908/1008) of the device(s) 110, natural language command processing system component(s), or the skill system component(s) 525, respectively. Thus, the ASR component 550 may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 525, as described herein, are illustrative, and may be located as a stand-alone device or may be included, in whole or in part, as a component of a larger device or system. As can be appreciated, a number of components may exist either on a system component(s) and/or on device 110.

Figure 11:
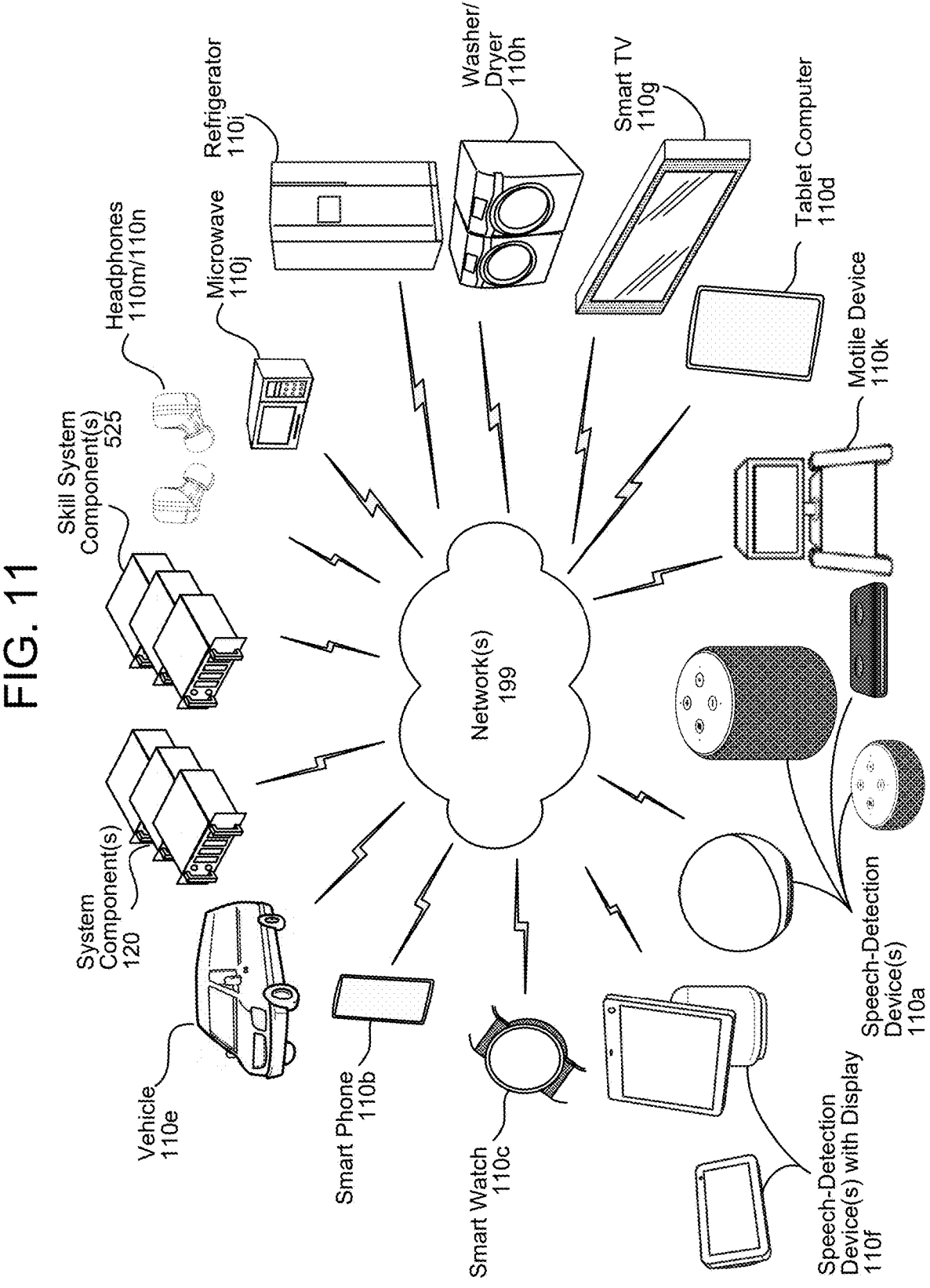
FIG. 11 illustrates an example of a network for use with the overall system, according to embodiments of the present disclosure.

As illustrated in FIG. 11, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, autonomously motile device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer-implemented method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input data representing a natural language question;
   generating first response data representing a natural language answer corresponding to the natural language question;
   determining a first entity represented in one or both of the first input data or the first response data, the first entity corresponding to a first name;
   receiving a first natural language description of the first entity;
   processing the first input data and the first response data using a first neural network encoder to determine first embedding data representing a context embedding of the first input data and the first response data, the first neural network encoder representing a pretrained sentence encoder;
   processing the first name and the first natural language description of the first entity using a second neural network encoder to determine second embedding data;
   determining a first entity salience score based on a cosine similarity between the first embedding data and the second embedding data;
   determining a second entity salience score using the first embedding data and third embedding data corresponding to a second entity represented in one or both of the first input data or the first response data;
   determining, using the first entity salience score and the second entity salience score, that the first entity is more salient than the second entity to the first input data and the first response data;
   in response to determining that the first entity is more salient than the second entity, receiving first additional data corresponding to the first entity; and
   causing a user device to present the first response data and an indication of the first additional data.

2. The computer-implemented method of claim 1, further comprising:
   receiving first training data representing unlabeled natural language sentences;

processing the first training data using a third neural network encoder to determine third embedding data;

determining first entity salience data using the third embedding data and fourth embedding data corresponding to a plurality of entities represented in the first training data;

determining second training data using the first training data and the first entity salience data;

processing the second training data using a fourth neural network encoder to determine second entity salience data, the fourth neural network encoder applying a self-attention mechanism across the second training data and entity data representing the plurality of entities;

determining third training data using the second training data and the second entity salience data; and determining the first neural network encoder and the second neural network encoder using the third training data.

3. A computer-implemented method comprising:

receiving first data representing a first natural language passage of text;

determining first embedding data using the first data and a first neural network encoder;

determining, using the first embedding data and second embedding data corresponding to a first entity represented in the first data, a first value representing a first salience of the first entity to the first natural language passage of text;

determining, using the first embedding data and third embedding data corresponding to a second entity represented in the first data, a second value representing a second salience of the second entity to the first natural language passage of text;

determining, based on a comparison of the first value and the second value, to augment an output corresponding to the first data using additional data corresponding to the first entity;

in response to determining to augment an output corresponding to the first data using additional data corresponding to the first entity, receiving second data corresponding to the first entity;

causing output of first output data corresponding to the first data; and causing output of an indication of the second data with the first output data.

4. The computer-implemented method of claim 3, further comprising:

receiving first input data representing a natural language question;

receiving first response data representing a natural language answer corresponding to the natural language question; and determining the first data using the first input data and the first response data, the first natural language passage of text representing the natural language question and the natural language answer.

5. The computer-implemented method of claim 3, further comprising:

receiving, from the first neural network encoder, third data representing token-level embeddings of the first data;

determining the second embedding data using the third data and first text data representing a first name of the first entity; and determining the third embedding data using the third data and second text data representing a second name of the second entity.

6. The computer-implemented method of claim 3, further comprising:

processing, using an attention mechanism, the first embedding data and the second embedding data to determine third data, wherein the first value is determined using the third data.

7. The computer-implemented method of claim 3, further comprising:

receiving first training data;

determining, using a second neural network encoder, first entity salience data corresponding to a plurality of entities represented in the first training data;

determining second training data using the first training data and the first entity salience data;

processing the second training data using a third neural network encoder to determine second entity salience data, the third neural network encoder applying an attention mechanism across the second training data and entity data representing the plurality of entities;

determining third training data using the second training data and the second entity salience data; and determining, using the third training data, the first neural network encoder.

8. The computer-implemented method of claim 7, further comprising:

processing the third training data using the second neural network encoder to determine the first neural network encoder, the first neural network encoder representing an update of the second neural network encoder.

9. The computer-implemented method of claim 3, further comprising:

receiving a first natural language description of the first entity; and processing the first natural language description using a second neural network encoder to determine the second embedding data.

10. The computer-implemented method of claim 3, further comprising:

determining, using the second data, image data representing a picture of the first entity, wherein causing output of the indication includes causing output of the image data on a display.

11. The computer-implemented method of claim 3, further comprising:

determining, using the second data, a hyperlink to an online resource corresponding to the first entity; and associating the hyperlink with a portion of the first output data corresponding to the first entity.

12. A system, comprising:

at least one processor; and at least one memory comprising instructions that, when executed by the at least one processor, cause the system to:

receive first data representing a first natural language passage of text;

determine first embedding data using the first data and a first neural network encoder;

determine, using the first embedding data and second embedding data corresponding to a first entity represented in the first data, a first value representing a first salience of the first entity to the first natural language passage of text;

determine, using the first embedding data and third embedding data corresponding to a second entity represented in the first data, a second value representing a second salience of the second entity to the first natural language passage of text;

determine, based on a comparison of the first value and the second value, to augment an output corresponding to the first data using additional data corresponding to the first entity;

in response to determining to augment an output corresponding to the first data using additional data corresponding to the first entity, receiving second data corresponding to the first entity;

cause output of first output data corresponding to the first data; and cause output of an indication of the second data with the first output data.

13. The system of claim 12, wherein the instructions further cause the system to:

receive first input data representing a natural language question;

receive first response data representing a natural language answer corresponding to the natural language question; and determine the first data using the first input data and the first response data, the first natural language passage of text representing the natural language question and the natural language answer.

14. The system of claim 12, wherein the instructions further cause the system to:

receive, from the first neural network encoder, third data representing token-level embeddings of the first data;

determine the second embedding data using the third data and first text data representing a first name of the first entity; and determine the third embedding data using the third data and second text data representing a second name of the second entity.

15. The system of claim 12, wherein the instructions further cause the system to:

process, using an attention mechanism, the first embedding data and the second embedding data to determine third data, wherein the first value is determined using the third data.

16. The system of claim 12, wherein the instructions further cause the system to:

receive first training data;

determine, using a second neural network encoder, first entity salience data corresponding to a plurality of entities represented in the first training data;

determine second training data using the first training data and the first entity salience data;

process the second training data using a third neural network encoder to determine second entity salience data, the third neural network encoder applying an attention mechanism across the second training data and entity data representing the plurality of entities;

determine third training data using the second training data and the second entity salience data; and determine, using the third training data, the first neural network encoder.

17. The system of claim 16, wherein the instructions further cause the system to:

process the third training data using the second neural network encoder to determine the first neural network encoder, the first neural network encoder representing an update of the second neural network encoder.

18. The system of claim 12, wherein the instructions further cause the system to:

receive a first natural language description of the first entity; and process the first natural language description using a second neural network encoder to determine the second embedding data.

19. The system of claim 12, wherein the instructions further cause the system to:

determine, using the second data, image data representing a picture of the first entity, wherein causing output of the indication includes causing output of the image data on a display.

20. The system of claim 12, wherein the instructions further cause the system to:

determine, using the second data, a hyperlink to an online resource corresponding to the first entity; and associate the hyperlink with a portion of the first output data corresponding to the first entity.

* * * * *